(12) United States Patent
Bosso et al.

(10) Patent No.: US 6,282,332 B1
(45) Date of Patent: Aug. 28, 2001

(54) WAVEGUIDE STRUCTURES IN PARTICULAR FOR USE IN ACOUSTO-OPTICAL MODE CONVERTERS AND METHOD FOR MAKING SAME

(75) Inventors: Sergio Bosso, Buccinasco (IT); Harald Herrmann, Paderborn (DE); Salvatore Morasca, Como; Steffen Schmid, Monza, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/324,768

(22) Filed: Jun. 3, 1999

Related U.S. Application Data

(60) Provisional application No. 60/091,038, filed on Jun. 29, 1998.

(30) Foreign Application Priority Data

Jun. 4, 1998 (EP) .................................................. 98110172

(51) Int. Cl.$^7$ .................................................. G02F 1/335
(52) U.S. Cl. .................................................. 385/7; 359/305
(58) Field of Search .................................. 385/7; 359/305

(56) References Cited

U.S. PATENT DOCUMENTS

| 3,850,503 | 11/1974 | Riseberg et al. ........................ 350/96 |
| 4,851,079 | 7/1989 | Booth et al. .......................... 156/643 |
| 4,906,063 | 3/1990 | Sato et al. ............................... 350/96 |
| 5,119,447 | 6/1992 | Trisno ......................................... 385/3 |
| 5,168,542 | 12/1992 | Chakravorty et al. ............... 385/132 |
| 5,227,011 | 7/1993 | Enomoto et al. ..................... 156/643 |
| 5,452,314 | 9/1995 | Aronson .................................. 372/20 |
| 5,609,775 | 3/1997 | Liu .......................................... 216/77 |

FOREIGN PATENT DOCUMENTS

| 44 33 844 A1 | 3/1996 | (DE) . |
| 0 680 164 A2 | * 11/1995 | (EP) . |
| 0 737 880 A1 | 10/1996 | (EP) .............................. G02F/1/125 |
| 0 784 362 A1 | 7/1997 | (EP) .................................. H01S/3/06 |
| 2 304 917 | 3/1997 | (GB) . |
| 89/10534 | 11/1989 | (WO) .............................. G01B/9/02 |

OTHER PUBLICATIONS

Patent Abstracts of Japan, vol. 095, No. 4, Jan. 31, 1995 & JP 07 127941 A.
Patent Abstracts of Japan, vol. 018, No. 510 (P–1804), Jun. 24, 1994 & JP 06 174908.
Patent Abstracts of Japan, Publication No. 59033431, Publication date Feb. 23, 1984.
Aronson et al., "Acoustic Pulse Measurements of Acousto–Optic Tunable Filter Properties," Hewlett Packard Laboratories, IPR19S, Dana Point, post–deadline paper #6–2 (No Date).

(List continued on next page.)

*Primary Examiner*—John D. Lee
*Assistant Examiner*—Michelle R. Connelly-Cushwa
(74) *Attorney, Agent, or Firm*—Finnegan, Henderson, Farabow, Garrett & Dunner, L.L.P.

(57) ABSTRACT

The invention relates to optical birefringent waveguides, acousto-optical devices using such optical waveguides and an acoustic waveguide as well as a manufacturing method therefore. The optical waveguides of the invention exhibit a small birefringent variation with respect to a change of waveguide parameters, if the fundamental mode propagating in the optical waveguide has a propagation constant near to the cut-off condition. The optical waveguide dimensions are typically chosen such that the cut-off wavelength of the waveguide is below 1650 nm for an operating wavelength in the window between 1530 nm and 1656 nm. The acousto-optic mode converter using such optical waveguides have a superior conversion characteristic over the conversion frequency with reduced side lobes. Therefore, using the thin and narrow optical waveguides of the invention, a superior performance of the acousto-optical devices using such an optical waveguide can be obtained.

28 Claims, 30 Drawing Sheets

OTHER PUBLICATIONS

D.A. Smith, et al., Source of Sidelobe Asymmetry in Integrated Acousto–Optic Filters, Appl. Phys. Lett., vol. 52, pp. 814–816 (1993).

S. Schmid, et al., "Full Wafer Scale Fabrication of Acousto–Optic 2×2 Wavelength Selective Space Switches on $LiNbO_3$," ECIO'95 Proceedings $7^{th}$ European Conference on Integrated Optice, Apr. 3–6, 1995, pp. 21–34.

H. Herrmann, et al., "Tapered Acoustical Directional Couplers for Integrated Acousto–Optical Mode Converters with Weighted Coupling," Journal of Lightwave Technology, vol. 13, No. 3, pp. 364–374, Mar. 1995.

Morasca, et al., "Application of $LiNbO_3$ Acousto Optic Tunable Switches and Filters in WDM Transmission Networks at High Bit Rates," published Giancarlo Prati (Ed.): "Photonics Networks", pp. 458–472, Springer 1997.

"Guided–Wave Optoeletronics," Theodor Tamir (Ed.), Springer 1990, pp. 146–149.

Fiber Optic Communications Handbook, Second Edition, pp. 390–394 (No date).

European Search Report dated Nov. 6, 1998.

2.1 Optische Wellenleiter, Herstellung Optischer Wellenleiter, Kapitel 2. Der Polarisationsteiler, pp. 8–10—No Translation, No date.

Neyer, "Low–crosstalk Passive Polirization Splitters Using $TnLiNbO_3$ Waveguide Crossings," Appl. Phys. Lett. 55(10), Sep. 4, 1989, pp. 927–929.

Levi, et al., "External Modulations System for AM Fiber CATV Transport," A paper presented at Fiber Optics Plus '92, Jan. 8–9, 1992.

European Search Report dated Nov. 12, 1998.

Patent Abstract of Japan, Publication No. 61198106, Publication Date Sep. 2, 1986.

Patent Abstracts of Japan, Publication No. 58211106, Publication Date Dec. 8, 1983.

* cited by examiner

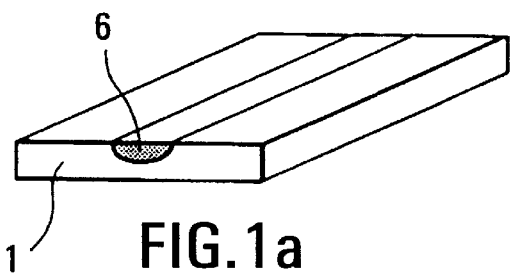
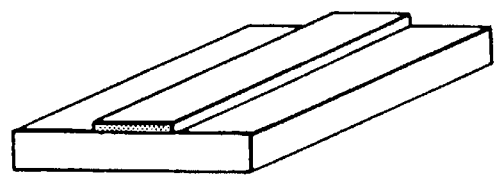
FIG.1a          FIG.1b
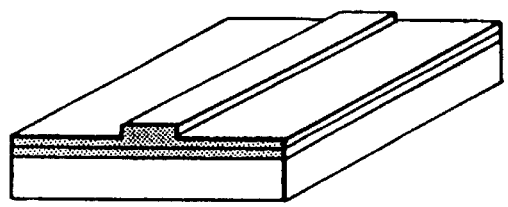
FIG.1c
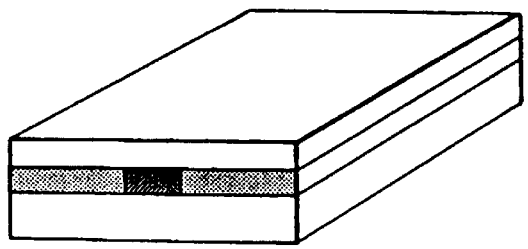
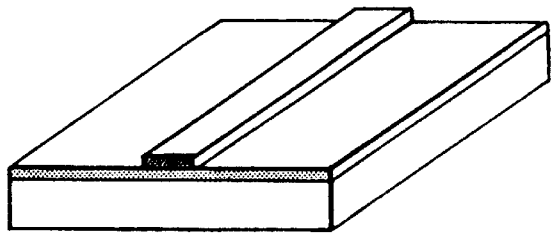
FIG.1d          FIG.1e

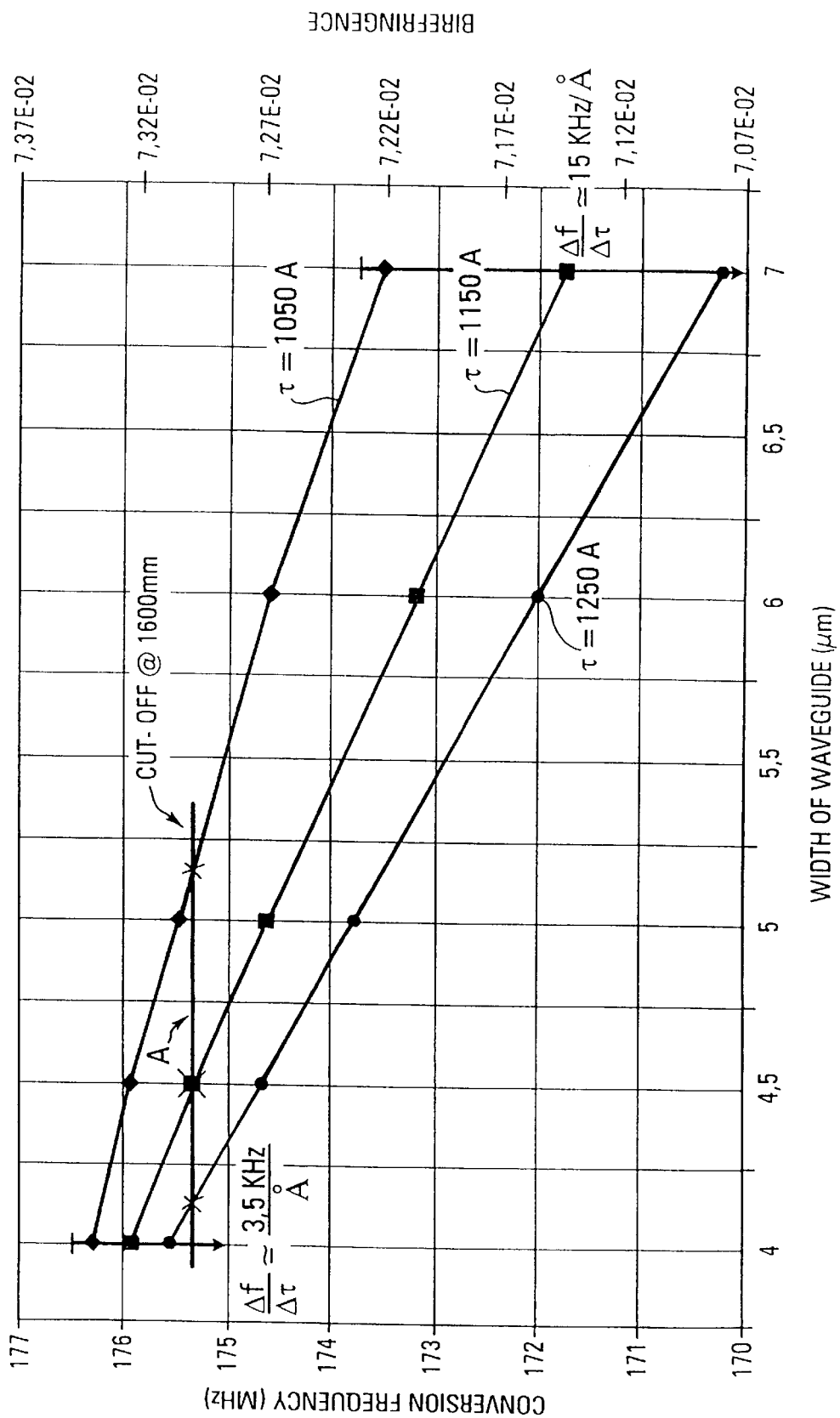
FIG.9a CONVERSION FREQUENCIES AS FUNCTION OF WAVEGUIDE PARAMETERS

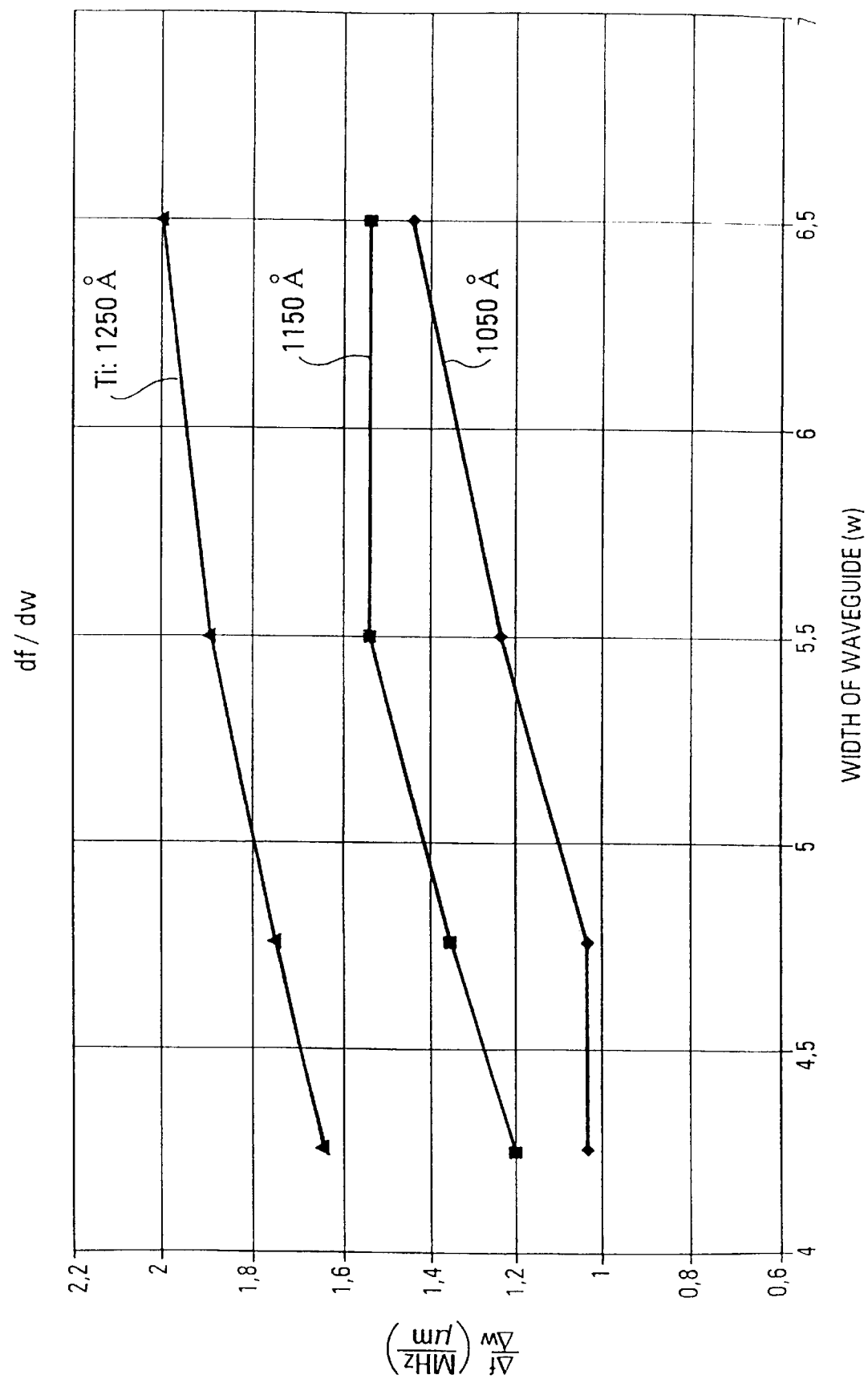

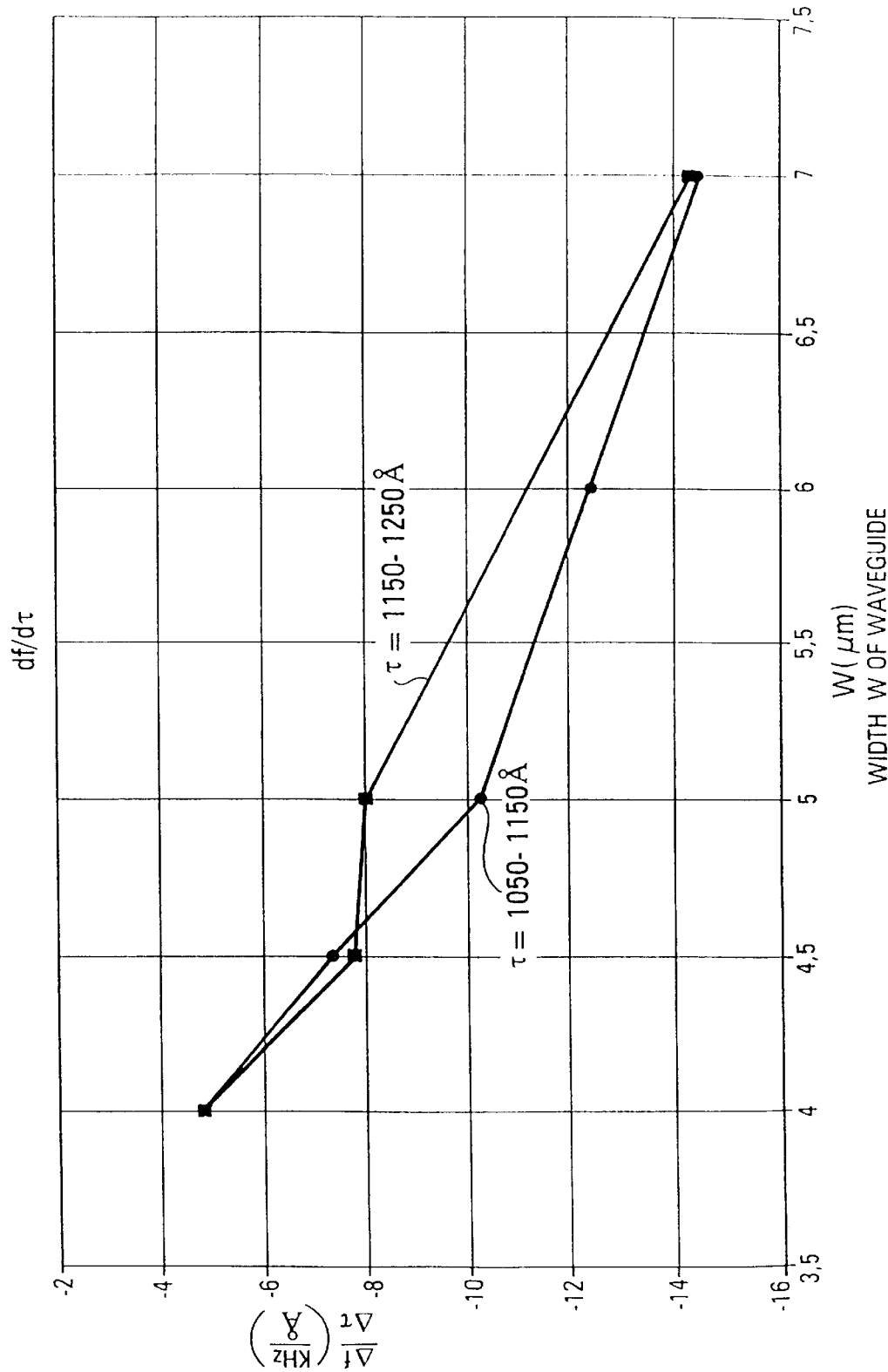

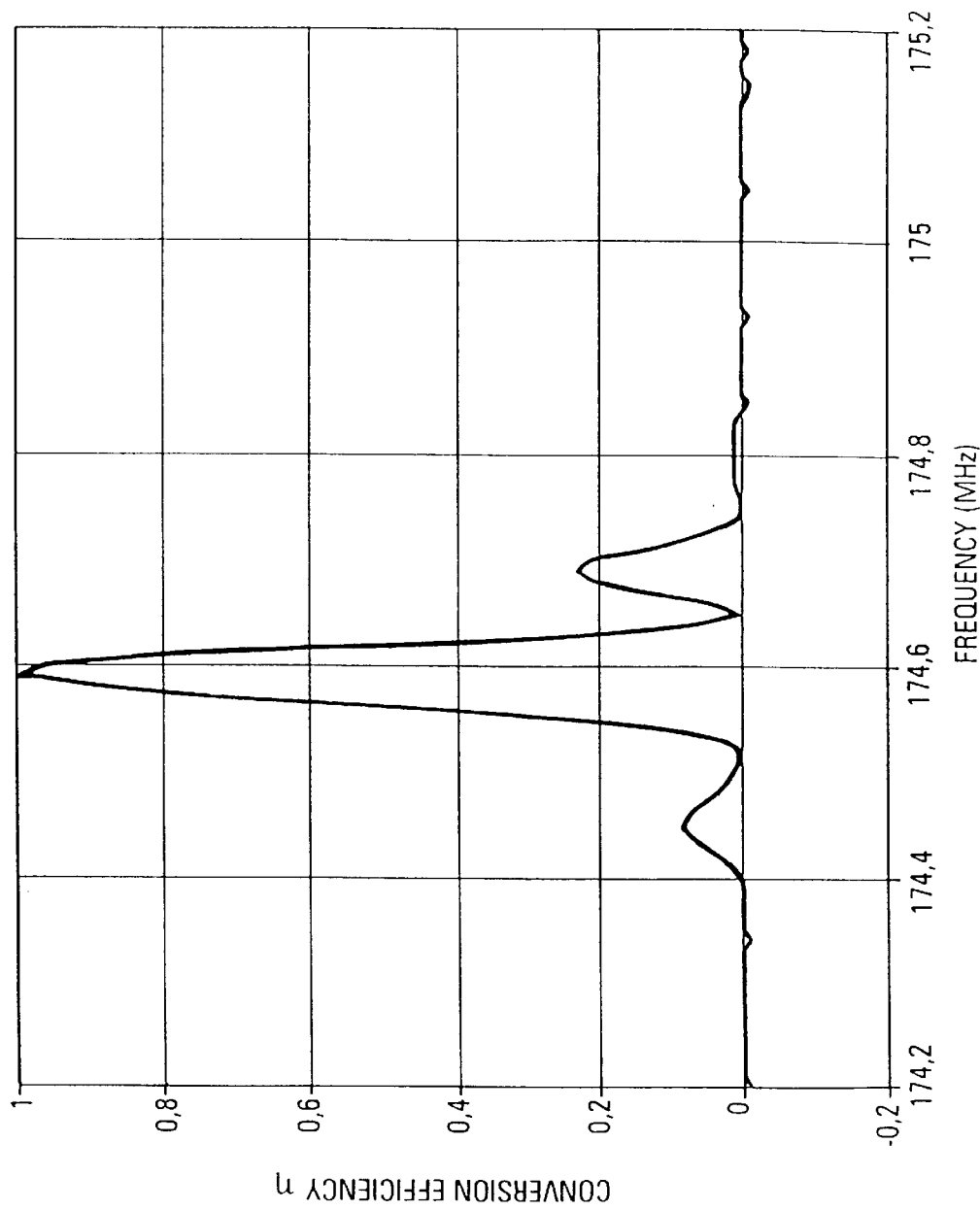

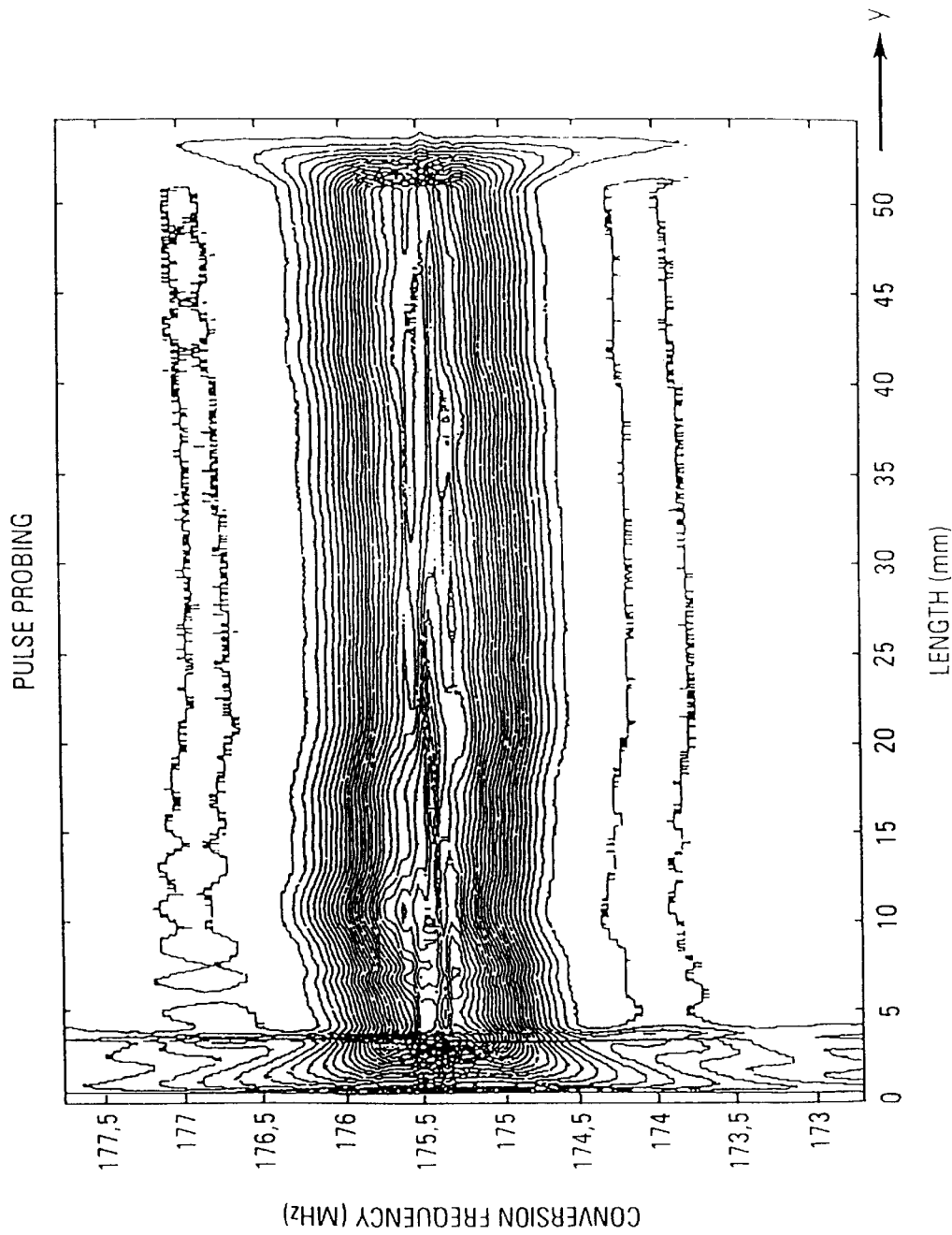
FIG.11b VARIATION OF THE PHASE MATCHING FREQUENCY 1050 Å / 4.5 μm
PULSE PROBING

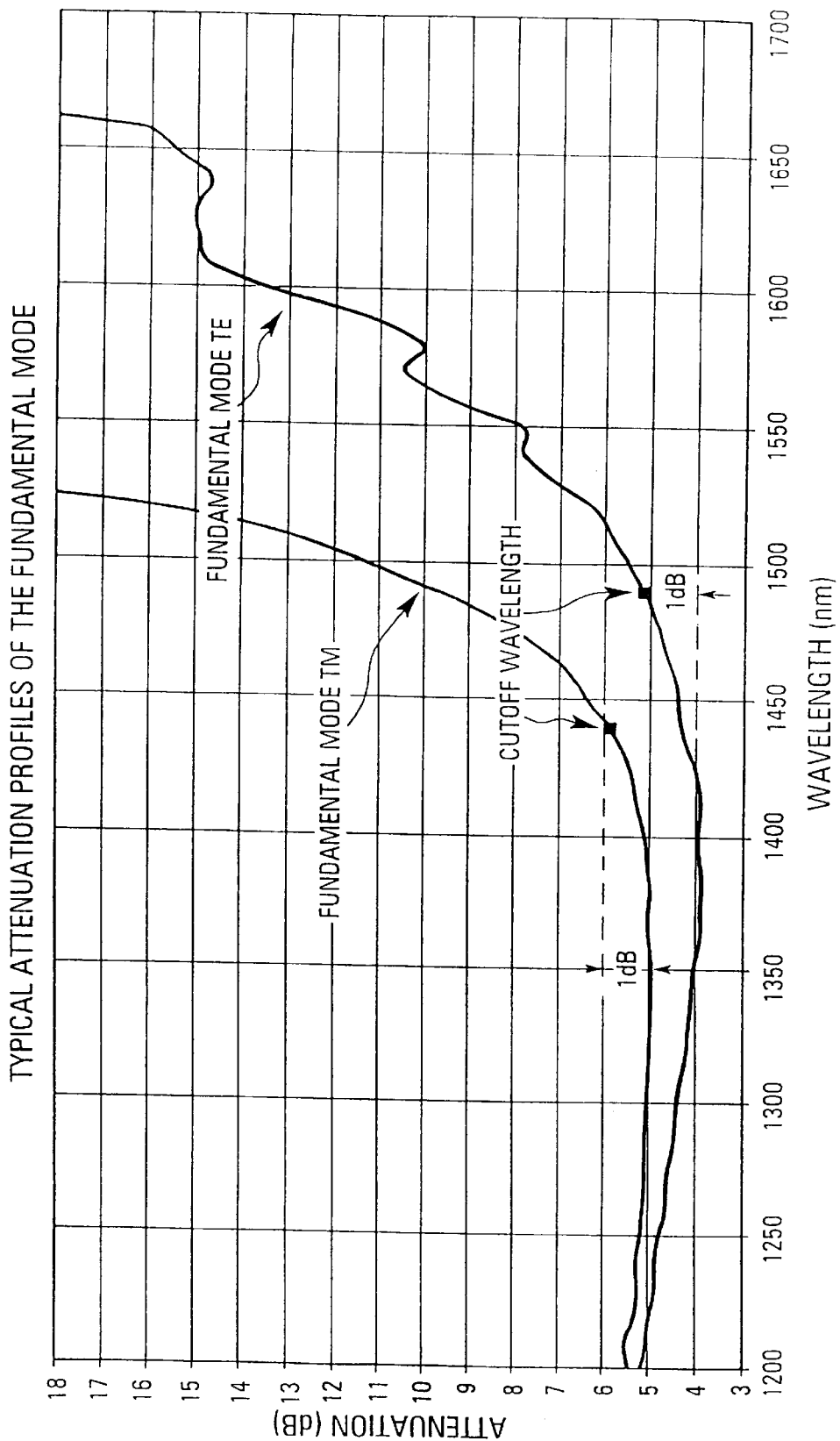

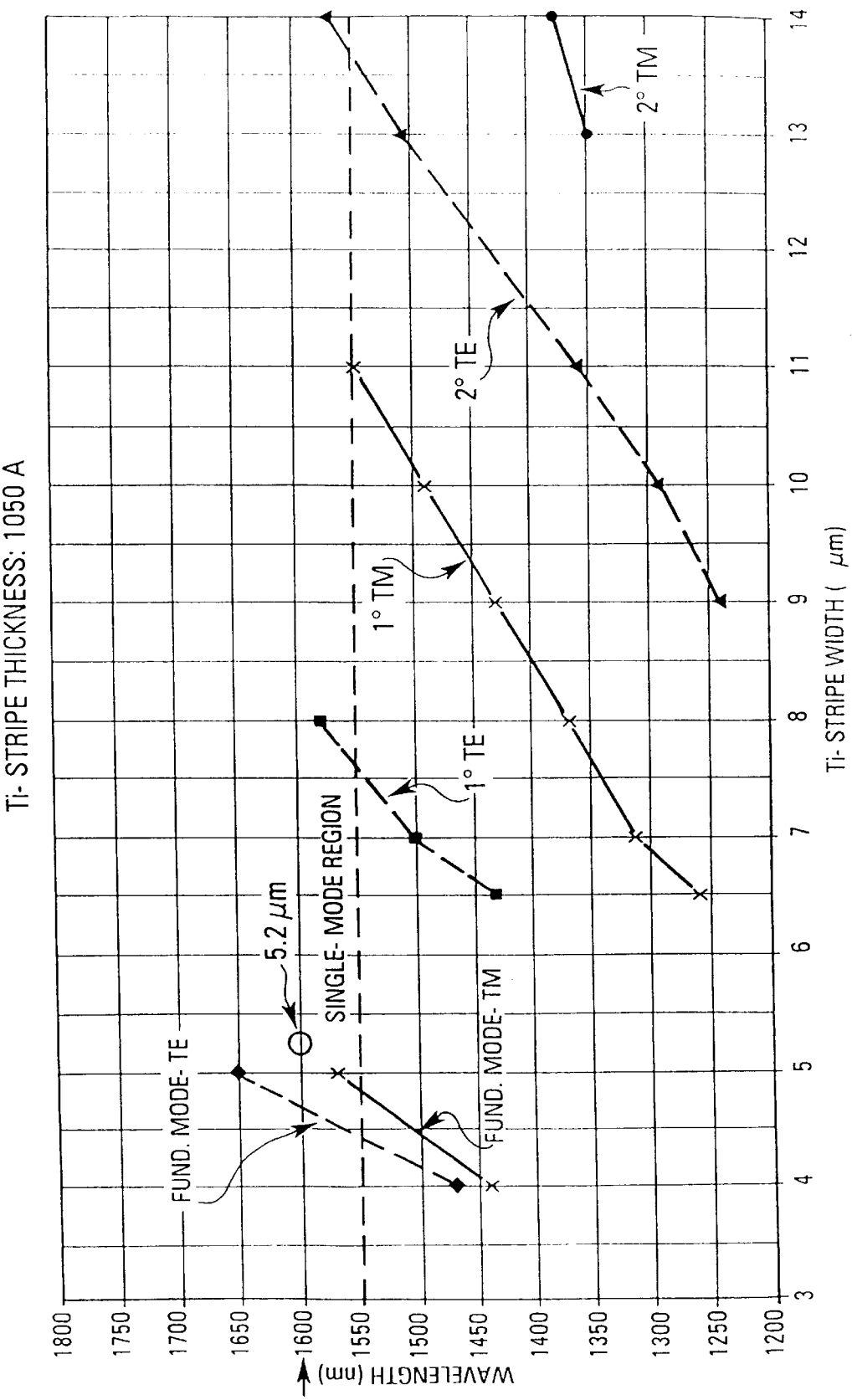

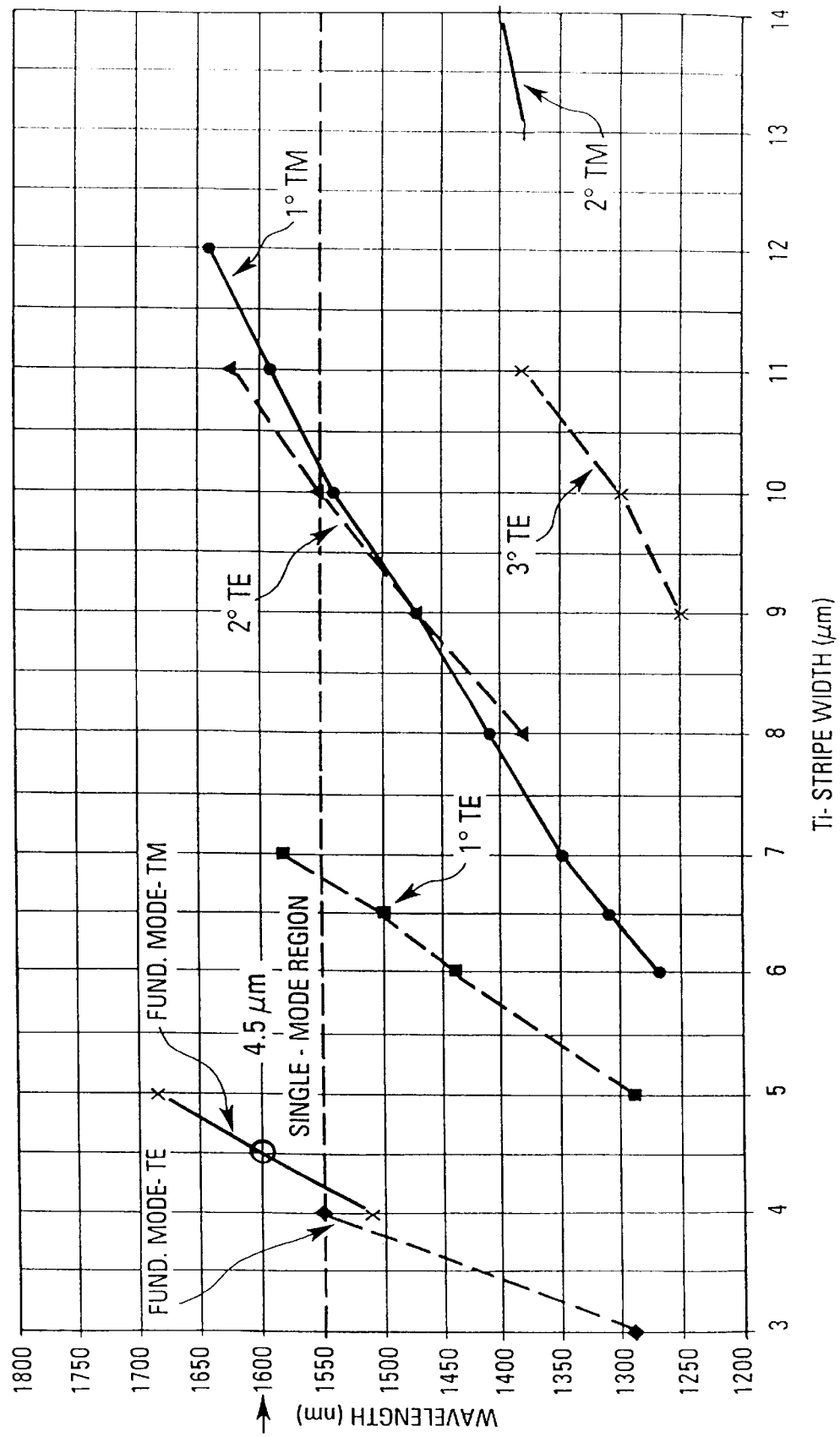

Ti- STRIPE THICKNESS: 1250 Å

WAVEGUIDE STRUCTURES IN PARTICULAR FOR USE IN ACOUSTO-OPTICAL MODE CONVERTERS AND METHOD FOR MAKING SAME

This application claims the benefit of U.S. provisional application Ser. No. 60/091,038, filed Jun. 29, 1998, which is incorporated herein by reference.

FIELD OF THE INVENTION

Generally, the invention relates to optical waveguides made in a birefringent substrate, wherein the refractive index $n_{eff,TE,TM}$ for the quasi TE and quasi TM-modes in the waveguides will respectively have slightly different values with respect to the substrate index. In particular, the invention relates to integrated optic devices like acousto-optical mode converters, acousto-optical switches and acousto-optical filters using such birefringent optical waveguides as a core element. The invention aims at providing optical waveguide structures and manufacturing methods therefore, which allow to keep the variations of the birefringence along the optical waveguides as small as possible resulting in an overall improved performance of integrated optic devices using such waveguide structures.

BACKGROUND OF THE INVENTION

The optical waveguide structures are not limited to any particular type of waveguide, i.e. the invention can for example be applied to a diffused or embedded waveguide (FIG. 1a), a raised stripe waveguide (FIG. 1b), a rib waveguide or optical strip-line (FIG. 1c), a general channel waveguide (FIG. 1d) or a ridge waveguide (FIG. 1e).

Furthermore, the optical waveguide structures are not limited to any particular longitudinal geometry, i.e. any kind of straight or curved geometry as used in Y-junctions, polarising beam splitters etc. can be used. FIG. 2 shows examples of such basic structures: FIG. 2a: Y-junction, FIG. 2b: WDM-device; FIG. 2c: star coupler and FIG. 2d: polarising beam coupler.

The diffused channel waveguide of FIG. 1a comprises for example a substrate material of $LiNbO_3$ with a waveguide made by titanium indiffusion. Due to the imperfections during the fabrication processes used for making the waveguides in FIG. 1 (for example disuniformities in the titanium stripe dimensions, temperature gradients during diffusion, etc.) the effective waveguide birefringence varies locally over the wafer used for making a plurality of such devices at the same time and also as an averaged value from wafer to wafer. The performance of single optical components (e.g. straight and curved waveguides) as well as more complex integrated optical devices, like an acousto-optical mode converter depends critically on the uniformity of the waveguide birefringence. Thus, the overall performance and reproducibility of acousto-optical devices strongly depends on the homogeneity and reproducibility of the fabrication processes.

Birefringence essentially means that the effective index (or the propagation constant) for (quasi) TE-modes and TM-modes is different and therefore the requirement of a small variation of birefringence means that the difference in propagation constants or the difference in refractive index $\Delta n$ remains the same along the optical waveguide as much as possible.

The birefringence variations can have detrimental effects even in simple single waveguides. In integrated optics and also in distributed optical communication systems it is often desirable to switch the input polarisation of a TE-mode to the TM-polarisation and this can, for example, be performed by electro-optical couplers or by an acousto-optical mode converter. The latter device is based on the usage of a birefringent optical waveguide and if this waveguide has birefringent variations this will cause the performance of this device to deteriorate drastically.

The detrimental effects of birefringent variation in the basic acousto-optical mode converter are explained with reference to FIG. 3. The working principle of an integrated acousto-optical device e.g. on $LiNbO_3$ is based on a wavelength selective polarisation conversion between two co-propagating optical waves polarised along the main birefringence axes of the $LiNbO_3$-crystal i.e. between the "TM"- and "TE"-modes. Energy can be exchanged between these orthogonal polarisation modes when they get coupled by the off-diagonal elements in the dielectric tensor. This is possible for example by the electro-optic or photo-elastic effect as explained below. A surface acoustic wave, i.e. an elastic "Rayleigh-wave" in a photoelastic and piezoelectric material such as in $LiNbO_3$ is an ideal means of coupling due to its tunability in frequency and in power.

As shown in FIG. 3 a straight monomodal waveguide of conventionally for example 7 μm is embedded in about a 100 μm wide monomodal acoustic-waveguide (x-cut, y-propagating $LiNbO_3$-crystal). Both optical waveguides and acoustic claddings are fabricated by a titanium indiffusion. Metal-interdigital transducers of a suitable configuration are deposited on top of the crystal at the beginning of the acoustic waveguide. By applying a RF-drive signal at the interdigital transducer electrode an acoustic wave is excited. The acoustic wave travelling along the interaction length induces the mode coupling for the optical polarisation modes. To define a certain conversion band width, the interaction length L is limited by an acoustic absorber.

A fundamental condition for energy transfer is the phase matching between the polarisation modes which results from the solution of the coupled wave equations. A conversion efficiency of 100% can only be achieved if the phase difference between the two optical modes (TE- and TM-modes) with different effective refractive indices is continuously compensated, which means a completely synchronous interaction along the interaction length. This synchronous interaction is essentially caused by means of an acoustic "Bragg"-grating having a pre-determined period and inducing a coupling between the "TE"- and "TM"-mode. The coupling effect is described by the following equation:

$$\frac{2\pi n_{eff,TM}}{\lambda} - \frac{2\pi n_{eff,TE}}{\lambda} = \beta_{TM} - \beta_{TE} = \Delta\beta = \frac{2\pi}{\Lambda_{oc}} \quad (1)$$

Here $n_{eff,TM}$ and $n_{eff,TE}$ are the effective refractive indices for the (quasi) TE- and TM-modes, $\beta_{TM}$, $\beta_{TE}$ are the propagation constants for the wavelength λ (in vacuum) and $\Lambda_{ac}$ is the wavelength of the acoustic wave (i.e. the periodicity of the perturbation of the dielectric tensor induced for instance by a periodic electric field or a surface corrugation, i.e. the acoustic "Bragg"-grating. Typically, the $\Lambda_{ac}$ is about 20–21 μm for λ=1530–1570 mm. The propagation constant (wavenumber $K_{ac}$) is $$K_{ac} = \frac{2\pi}{\Lambda_{ac}} = \frac{2\pi f_{ac}}{v_{ac}} \quad (2)$$

where $\Lambda_{ac}$ is the acoustic wavelength, $f_{ac}$ is the frequency and $v_{ac}$ is the velocity of the acoustic wave. This is a phase matched (and thus wavelength dependent) process and a variation of the waveguide birefringence has a drastic effect on the phase matching and thus negatively influences the spectral conversion characteristics. The longer the waveguide is, the more detrimental the variations of birefringence on the phase matching is.

For optical wavelengths which do not fulfil the phase matching conditions the deviation $\delta$ from the ideal phase match condition can be expressed by the following equation:

$$\delta = \frac{1}{2}(\Delta\beta - K_{ac}) = \frac{\pi}{\lambda}\Delta n_{\it eff} - \frac{\pi f_{ac}}{v_{ao}} = \frac{\pi}{\lambda}\left(\Delta n_{\it eff} - \frac{\lambda}{\Lambda_{ao}}\right) \quad (3)$$

where $\Delta n_{\it eff}$ is the difference between the effective refractive indices of the guided polarisation modes. At a fixed acoustic frequency $f_{ac}$, the value $\delta$ is a function of the optical wavelength $\lambda$ and of $\Delta n_{\it eff}$. Only for $\delta=0$ a perfect phase matching exists and a complete energy transfer is possible. In a highly birefringent material as $LiNbO_3$ ($\Delta n_{\it eff} \approx 0.072$) the phase mismatch $\delta$ is a relatively strong function of the wavelength and hence $LiNbO_3$ is a good candidate to fabricate components with conversion characteristics of small bandwidths. However, variations in $n_{\it eff,TE}$, $n_{\it eff,TM}$ (i.e. $\Delta n_{\it eff}$) will influence whether or not a perfect phase matching can be achieved. The conversion efficiency $\eta$ in case of a phase matched interaction is given by:

$$\eta = \sin^2(\gamma\sqrt{P_{ac}L}) \quad (4)$$

where the factor $\gamma$ contains the material constants contributing to the coupling (elastooptic and piezoelectrical coefficient), $P_{ac}$ is the power of the acoustic wave and L is the length of the acousto-optical mode converter. It is seen that the conversion efficiency $\eta$ is, for the example of a constant coupling, approximately in the form of a (sin x/x)²-type behaviour (acoustic directional couplers with weighted coupling may for example possess a Gaussian-type behavior—therefore, the constant coupling only serves as one illustrative example here).

FIG. 4 shows a typical experimental result of measuring the conversion efficiency of a $LiNbO_3$ acousto-optical mode converter of the "constant coupling type" comprising a diffused waveguide of a width of 7.0 μm, a length of 60 mm and a height of 1250 Å ($Å=10^{-10}$m). The values of width and height correspond to values before indiffusion. The graph in FIG. 4 shows many side lobes an does not very well resemble a (sin x/x)² function due to strong variations in the birefringence of the optical waveguide.

FIG. 5 (relating to the same device as in FIG. 4) shows the phase matching frequency along an acousto-optic mode converter of 6 cm length for light of a wavelength of 1536 nm. The phase matching frequency and the effective birefringence are proportional to each other ($\Delta n_{\it eff}=\lambda \cdot f_{ac}/v_{ac}$; $v_{ac}=3780$ m/s for $LiNbO_3$ in the case of the above device). FIG. 5 illustrates that the type of optical waveguide used has a strong birefringence variation since the phase matching frequency alters along the longitudinal direction. Such experimental results can be obtained by using a pulse probing technique as is described in "Acoustic Pulse Measurements of Acousto-Optic Tunable Filter Properties" by L. B. Aronson, G. Ranken, T. R. Ranganath, D. W. Dolfi in (IPR'95, DANA POINT, post-deadline paper #6-2). Therefore, in order to improve the performance of any integrated optic device that uses an acoustic-optical mode converter, such as an acousto-optic tunable 2×2 wavelength space switch (FIG. 6) or an integrated acousto-optical filter (FIG. 7), the aim is to make the conversion efficiency (shown in FIG. 4) to correspond as much as possible with the ideal curve. In the case of a constant coupling this means to make the conversion efficiency to correspond with the (sin x/x)²-type behaviour. This is achieved by having the birefringence of the optical waveguide varying as little as possible along the optical waveguide (FIG. 5).

DESCRIPTION OF THE PRIOR ART

The source of sidelobe asymmetry in integrated acousto-optic filters was studied in "Source of Sidelobe Asymmetry in Integrated Acousto-Optic Filters" by D. A. Smith, a. d'Alessandro, J. E. Baran and H. Herrmann, published in Applied Physics letters, vol. 62, pages 814–816 (1933). Here, the optical waveguides of an acousto-optic filter used in experiments were formed from 8 μm-wide 800 Å-thick Ti stripes, diffused for 9.25 h at 1050° C. in air in a Pt crucible. Acoustic waveguides were 120 μm wide, formed by diffusing 250 μm wide, 1600 Å thick Ti stripe cladding regions for 30 h at 1050° c. it is found here, that the source of the asymmetry causing a cross-talk between wavelength-multiplexed optical channels is found to be influenced by the systematic even-order variation of the effective waveguide birefringence as a function of distance from the device center. Approximate simulations are presented that indicate what degree of non-uniformity of Ti-stripes thickness, width or diffusion temperature are responsible for such typical asymmetries. It is concluded that an intrinsic Δn variation is most likely due to a systematic longitudinal variation in device fabrication parameters, such as waveguide widths, layer thickness or diffusion temperature. It is also found that the sidelobe asymmetry may be caused from a systematic variation of the acoustic velocity profile. As remedies for sidelobe suppression it is suggested to impose a compensating structural bias on the optical waveguide widths loading to a cancellation of the boat-length non-uniformity.

S. Schmid, M. Sottocorno, A. Appleyard, S. Bosso report in "FULL WAFER SCALE FABRICATION OF ACOUSTO-OPTIC 22×2 WAVELENGTH SELECTIVE SPACE SWITCHES ON $LiNbO_3$", on pages 21–24 in the ECIO'95 proceedings (post-deadline papers) of the 7th European Conference on Integrated Optics, April 3–6, 1995, Delft, The Netherlands, that optical waveguides for use in acousto-optic mode converters were manufactured using an indiffusion of an about 1000 Å thick and 7 μm wide titanium stripe at a temperature of 1030° C. for 9 h. For an acousto-optic mode converter a degradation of the band-reject characteristics is observed when light of both polarisations is launched into the device. This degradation is found to be due to small birefringence inhomogenities caused by fabrication tolerances resulting in a phase match frequency to vary between 25 and 50 kHz.

In "TAPERED ACOUSTICAL DIRECTIONAL COUPLERS FOR INTEGRATED ACOUSTO-OPTICAL MODE CONVERTERS WITH WEIGHTED COUPLING" by H. Herrmann, U. Rust and K. Schäfer, IEEE Journal of Lightwave Technology, Vol. 13, Nr. 3, March 1995, pages 364–374, a polarisation independent integrated optical wavelength filter with a tapered acoustical directional coupler is discussed. Acoustic waveguides were fabricated via Ti-indiffusion into the cladding regions of the acoustical guide or the acoustical directional couplers. For such devices 1600 Å thick titanium layers were indiffused. This diffusion has been performed at 1060° C. during 24 h. Afterwards, the optical waveguides were fabricated by an indiffusion of 7 μm wide Ti-stripes during typically 9 h at 1030° C. It is reported that such waveguide parameters and manufacturing parameters yield a single mode optical waveguide for both TE and TM polarisations in the spectral range round λ=1.55 μm. The conversion characteristics of the mode converters disclosed here exhibited a slight asymmetry since the main side lobe on the left side of the main maximum is about 1.3 dB higher than that on the right side of the maximum. This asymmetry is here explained with the fact that the amplitudes of the even and odd surface acoustical wave modes are not exactly equal at the location of the optical waveguide. Here, the asymmetry is not attributed to a variation of the acoustic wave vector and therefore a variation of the phase matching condition along the device. It is here concluded that it should be possible to fabricate acousto-optical mode converters with a strong side lobe suppression, if the problems with the inhomogeneity can be handled. However, no design criteria are given for the optical waveguides to be used in the acousto-optical mode converters.

A summary paper of the fundamental physics and the working principle of acousto-optical tunable switches and filters is disclosed by S. Morasca, D. Scarano and S. Schmid "APPLICATION OF LiNbO$_3$ ACOUSTO-OPTICAL TUNABLE SWITCHES AND FILTERS IN WDM TRANSMISSION NETWORKS AT HIGH BIT RATES", published in Giancarlo Prati (Ed.): "Photonics Networks", pp. 458 to 472, Springer, 1997. For an operating wavelength of around 1550 nm a straight mono-mode optical waveguide of typically 7 μm is embedded in about a 100 μm wide monomodal acoustic waveguide. Both optical waveguides and acoustic claddings are fabricated by titanium indiffusion and aluminium interdigital transducers of suitable pitch are deposited on the top of the crystal at the beginning of the acoustic waveguide. Although it is discussed here, that the birefringent variations of the waveguide causes the phase mismatch, no design rules are indicated regarding the waveguide parameters and the fabrication parameters in order to have a small birefringence variation along the optical waveguide and a small dependency of the obtained birefringence with respect to a variation of the manufacturing parameters.

U.S. Pat. No. 5,452,314 (Aronson) describes an acousto-optic tunable filter (AOTF) with a pair of electrodes on opposite sides of an optical waveguide. A test of a single section AOTF with an interaction length of 50 mm was performed. Waveguides with widths of 5, 6 and 7 μm were formed by titanium indiffusion. The titanium thickness was 1075 Å and was diffused for six hours at 1050° C., in wet O$_2$. The filter was tested with a 1.55 μm wavelength DFB and the TM mode was found to be very lossy. This document does not disclose cut-off values for the optical waveguides indiffused in the substrate. Furthermore, since the device does not have an acoustic waveguide, this document does not provide any further information as to the propagation conditions (in particular, the cut-off wavelength) of an optical waveguide in a device including, in addition to the optical waveguide, an acoustical waveguide provided in the substrate, as disclosed in some of the other aforementioned references.

The applicant has determined that, in the absence of the acoustical waveguide, the propagation conditions in the optical waveguide and in particular the cut-off wavelength thereof are drastically different from the case of a device with an acoustic waveguide.

Furthermore, the extent as to which birefringence variations are caused along the optical waveguide is also influenced by the manufacturing method used for making the optical waveguide. FIG. 8 shows a conventional method for making a diffused waveguide as is generally described by Theodor Tamir (Ed.), "Guided-wave optoelectronics", Springer, 1990, pages 146 to 149. FIG. 8 describes the so-called "lift-off" method of making a diffused waveguide. A polished substrate 1 made e.g. from LiNbO$_3$ is cleaned and a photoresist 2 is deposited on the substrate 1. The photoresist 2 is of a dual tone type and parts which are not exposed during the first exposition to UV-light can be removed by a developer solution. A chromium mask 3 with a desired waveguide pattern 4 is placed in contact with the photoresist 2 which is exposed to UV-light. A baking step of the photoresist 2 follows, by heating the substrate to about 120° C. for approximately 210 s to cause a reversal of the photoresist characteristics. The photoresist is then exposed for a second time to UV-light, without the mask 3, to cause a reversal of the photoresist characteristics so as to achieve a negative photoresist during the development process. As shown in FIG. 8*b*, upon developing to remove the exposed photoresist 2, a window corresponding to a waveguide pattern is left in the photoresist 2. As shown in FIG. 8*c*, a titanium layer 5 is deposited over the entire structure by RF-sputtering, electron beam deposition or a resistively heated evaporator. As seen in FIG. 8*c*, the titanium layer 5 is deposited on the disposed region of the substrate 1 and on the photoresist 2. The entire structure is then placed in a photoresist solvent which removes the photoresist and the unwanted titanium leaving the desired strip of titanium 5 on the substrate 1 as is shown in FIG. 8*d*. The process from FIG. 8*c* to FIG. 8*d* is called the "lift-off" step. The entire structure is then heated to indiffuse the titanium strip 5 into the substrate 1 to form the indiffused waveguide 6 as is shown in FIG. 8*e*.

As is shown in FIG. 8*b*, by usage of a dual tone photoresist 2, invariably an undercut or negative gradient occurs. This undercut cannot be controlled in a predictable way. It has been found that normally the titanium strip 5 is about 0.5 μm to 2 μm wider than expected (desired) on the chromium mask pattern 4. For example, if the pattern 4 has a width of 7 μm, then the actual strip width can be up to 8.5 μm in an unpredictable way. However, the width variation results in variations also in the width of the indiffused waveguide 6 such that also the actual waveguide 6 has parameters deviating from the expected one in an unpredictable way. The applicant has found experimentally that the width of the waveguide can vary along the waveguide by 0.5 μm in an unpredictable way. Therefore, the applicant has observed that the lift-off method of making the indiffused waveguide cannot accurately control the waveguide parameters. Furthermore, the refractive index change for the ordinary and extraordinary indices are dependent on the actual titanium concentration such that also the refractive index change cannot be controlled in a precise predictable way using such a lift-off method.

The prior art so far has discussed the background and experimental results of the acousto-optical mode converters, however, no design criteria have been given which would allow to improve the birefringence variation and thus the variation of the phase matching. It was only observed that a systematic or non-systematic variation of the birefringence has bad effects on the overall performance of all integrated optical devices using such acousto-optical mode converters. Likewise, the effects of phase mismatch have been found to be dependent on an intrinsic birefringence variation in the used optical waveguide, however, no design criteria have been given that would allow to improve the optical waveguides in this respect.

Furthermore, the prior art has only discussed the conventional "lift-off" manufacturing method for the manufacturing of titanium diffused waveguides. However, the applicant has observed that in fact the lift-off method can not control waveguide parameters to such an extent that they would be optimal for use in acousto-optical mode converters.

SUMMARY OF THE INVENTION

The present invention aims at providing optical waveguides, in particular for use in acousto-optical mode converters, which have a smaller variation of the birefringence along the waveguide and are less sensitive to a variation of fabrication parameters.

Therefore, the problem that was faced by the inventors is:

providing an acousto-optical mode converter and a birefringent optical waveguide in particular for use in an acousto-optical mode converter as well as a method for manufacturing same which lead to smaller variations of the design parameters in particular to a reduced birefringence variation.

This problem is solved by an acousto-optical mode converter according to claim 1, 20. Furthermore, this problem is solved by an optical waveguide according to claim 17, 18, 21. Furthermore, this problem is solved by a method according to claim 9 or claim 19.

In addition to providing a new manufacturing method for a controlled homogenous fabrication of the waveguides, the invention solves the effects of process variations on the waveguide birefringence by providing a design rule, i.e. a set of fabrication parameters (waveguide stripe widths and thickness, diffusion temperature etc.), which result in a reduced sensitivity of the waveguide birefringence to possible variations of one or more fabrication parameters.

The inventors have found that smaller waveguides are less sensitive to variations of process parameters, both regarding the on-wafer and the wafer-to-wafer homogeneity. Furthermore, the inventors have found that the typical variations of the waveguide birefringence with Ti stripe thickness for different wafers have an about 3 to 4-times smaller influence on the variation of the phase match frequencies when reducing the waveguide width from the conventionally used 7.0 $\mu$m to 4.0 $\mu$m.

That is, the inventors have realised that "narrow" or "shallow" waveguides have a smaller birefringence variation than "wide" and "deep" waveguides. This means that the optical waveguides used in the acousto-optical mode converters should have a normalised frequency (of the single TE or TM-mode propagating in the optical waveguide) as close as possible to the cut-off frequency of the waveguide.

When operating in the region of 1530 nm to 1565 nm it was found that independent of the type of waveguide used (channel, ridge or stripe waveguide), the waveguide parameters and manufacturing parameters, respectively, should be chosen such that the lowest cut off wavelength should be smaller than 1650 nm and preferably larger than 1570 nm.

The inventors have found that the waveguide birefringence is more tolerant or more insensitive to changes in the fabrication parameters if the propagation constant is close to the cut-off wavelength.

Preferably, the height of a Ti stripe before indiffusion is in the range of 1050 Å to 1250 Å whilst the width thereof is preferably in the range of 4.0 $\mu$m to 5.5 $\mu$m. Using such optical waveguides made by an indiffusion of such a Ti stripe in acousto-optical devices results in an improved conversion characteristic.

Further, the inventors have found that when manufacturing a LiNbO$_3$ acousto-optical mode converter or an optical waveguide for using such a converter, such smaller Ti stripes should preferably be diffused at relatively higher temperatures (for example 1060° C. instead of 1030° C.) which increase the Ti concentration of the waveguide, however, results in waveguides having smaller birefringent variations.

Furthermore, the inventors have found that a manufacturing method where the conventional lift-off method is replaced by an RIE etching using a negative photoresist avoids the problems of undercuts and thus allows to control the waveguide width more accurately. This is in particular important for the waveguides with small width whose propagation constant or normalised frequency is near cut-off since here already minor changes in the waveguide parameters can cause the waveguide to go into cut-off.

Further advantageous embodiments and improvements of the invention can be taken from the dependent claims. Hereinafter the invention will be described with reference to its advantageous embodiments and with reference to the attached drawings.

BRIEF DESCRIPTION OF THE DRAWINGS

FIGS. 1a–1e show typical waveguide structures in integrated optical technology to which the invention is applicable;

FIG. 9a shows the dependency of the conversion frequency over the width of a waveguide together with the cut-off of the waveguide;

FIG. 9b shows the relative change of conversion frequency $\Delta f/\Delta w$ with respect to the width of the waveguide;

FIG. 10 shows the relative change of the conversion frequency $\Delta f \Delta \tau$ with respect to the layer thickness;

FIG. 11a shows the conversion efficiency $\eta$ over the frequency using an inventive optical waveguide (length L=60 mm) in an acousto-optical mode converter;

FIG. 11b shows the variation of the phase matching frequency along the longitudinal direction of the acousto-optical device of FIG. 11a (center value≐100% phase matching);

FIG. 12b shows attenuation profiles of the fundamental TE, TM modes obtained with the device from FIG. 12a;

FIG. 12c shows spectral attenuation of the fundamental and the first mode obtained with the device from FIG. 12a;

FIGS. 12d–12f shows measured cut-off wavelengths with respect to different Ti-stripe thicknesses and Ti-stripe widths;

BASIC EXPLANATION OF THE WAVEGUIDES ACCORDING TO THE INVENTION

Figures 2A, 2B:
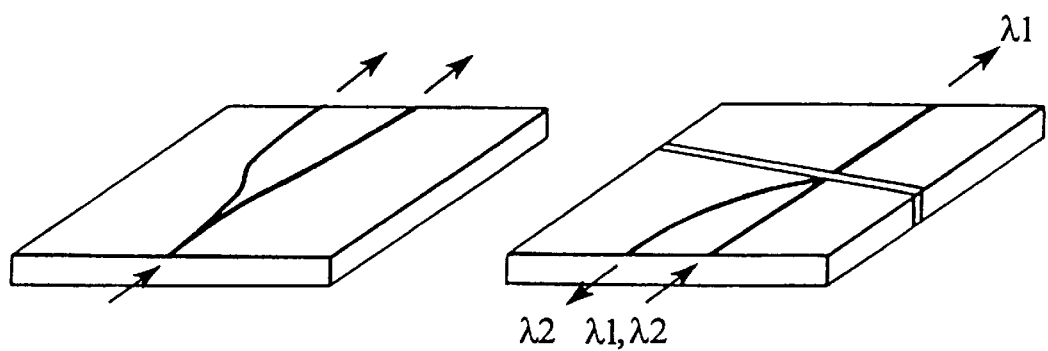
FIGS. 2a–2d show conceptional diagrams of some integrated optical components which can be built using the waveguide structures of FIGS. 1a–1e.
Figures 2C, 2D:
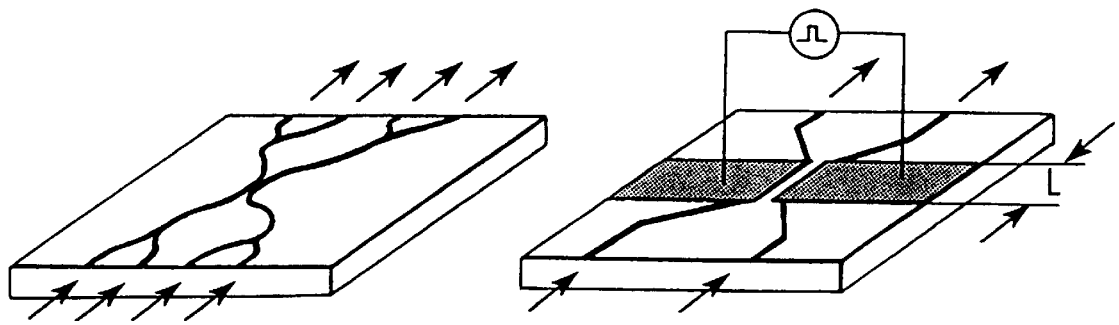

Advantages of the invention, e.g. the reduced birefringent variation of an optical waveguide, can be best illustrated when the optical waveguide is employed in an acousto-optical mode converter as described below.

FIG. 9a shows the experimental conversion frequency f plotted over the width of the waveguide (before indiffusion!) for different types of the waveguides. In FIG. 9a a diffused waveguide was employed as in FIG. 1 (a). An interesting parameter in FIG. 9a is the change of the conversion frequency $\Delta f$ over the change of depth (height) of the waveguide $\Delta \tau$, where $\tau$ designates the height of the channel waveguide (before diffusion). It is seen from FIG. 9a that a smaller width of the waveguide together with a smaller height of the waveguide results in smaller values of $\Delta f/\Delta \tau$. For example, whilst the ratio $\Delta f/\Delta \tau$ for a 7 μm is 15 kHz/Å, this ratio is only 3.5 KHz/Å for a 4.0 μm wide waveguide. On the right vertical scale, the birefringence values are indicated (i.e. the difference $\Delta n_{eff}$ between $n_{eff,TE}$ and $n_{eff,TM}$).

In FIG. 9a, the line A designates the cut-off of the optical waveguide for a wavelength $\lambda$=1600 mm. That is, naturally, the smaller the waveguide becomes, the closer the fundamental mode of a certain wavelength will be to the cut-off condition. However, as is seen with the changing gradient of the curves near the cut-off boundary, the ratio $\Delta f/\Delta w$ becomes smaller closer to the cut-off boundary. From this a general relationship can be derived, namely that for a given desired optical wavelength of propagation (and refractive index change between the waveguide and its surrounding medium), the propagation constant of the fundamental (and only) mode should be as close to cut-off as possible.

This advantage of a reduction of the birefringent variation is also seen from FIG. 9b and FIG. 10, which respectively show against the width of the waveguide W the variation of the conversion frequency $\Delta f/\Delta w$ with respect to the change of width and the change of conversion frequency $\Delta f/\Delta \tau$ with respect to a change of height. In FIG. 9b and FIG. 10 the variation $\Delta f/\Delta w$ and $\Delta f/\Delta \tau$ respectively becomes smaller, in absolute value, the smaller the waveguide widths w becomes. Furthermore, it is also seen that smaller heights of waveguides (e.g. $\tau$=1050 Å) lead to smaller absolute values of the changes $\Delta f/\Delta w$, $\Delta f/\Delta \tau$. The derivative of the conversion frequency with respect to the titanium layer thickness $\Delta f/\Delta \tau$ (FIG. 10) depends strongly from the waveguide width w. FIG. 10 also shows the values of −15 kHz/Å for a 7 μm wide waveguide (width before indiffusion) and −5 kHz/Å at 4 μm already indicated in FIG. 9a. That is, the waveguide in FIG. 10 is about 3-times less sensitive against inhomogenities (variations or changes due to the manufacturing method) of the titanium layer thickness.

As seen from FIG. 9b, on the other hand, waveguides with relatively small layer thickness (height) are less sensitive with respect to inhomogenities in the waveguide width. A simple estimation considering real process related differences indicates that a 4 μm wide waveguide having a titanium layer thickness of 1050 Å is about 4- to 5-times less sensitive to typical fabrication tolerances than a conventional 7 μm wide waveguide having a titanium layer thickness of 1250 Å. The most preferable pair of layer height/waveguide width is 1250 Å/4.1 μm. Other preferable values are 1050 Å/5.2 μm and 1150 Å/4.5 μm.

Figure 4:
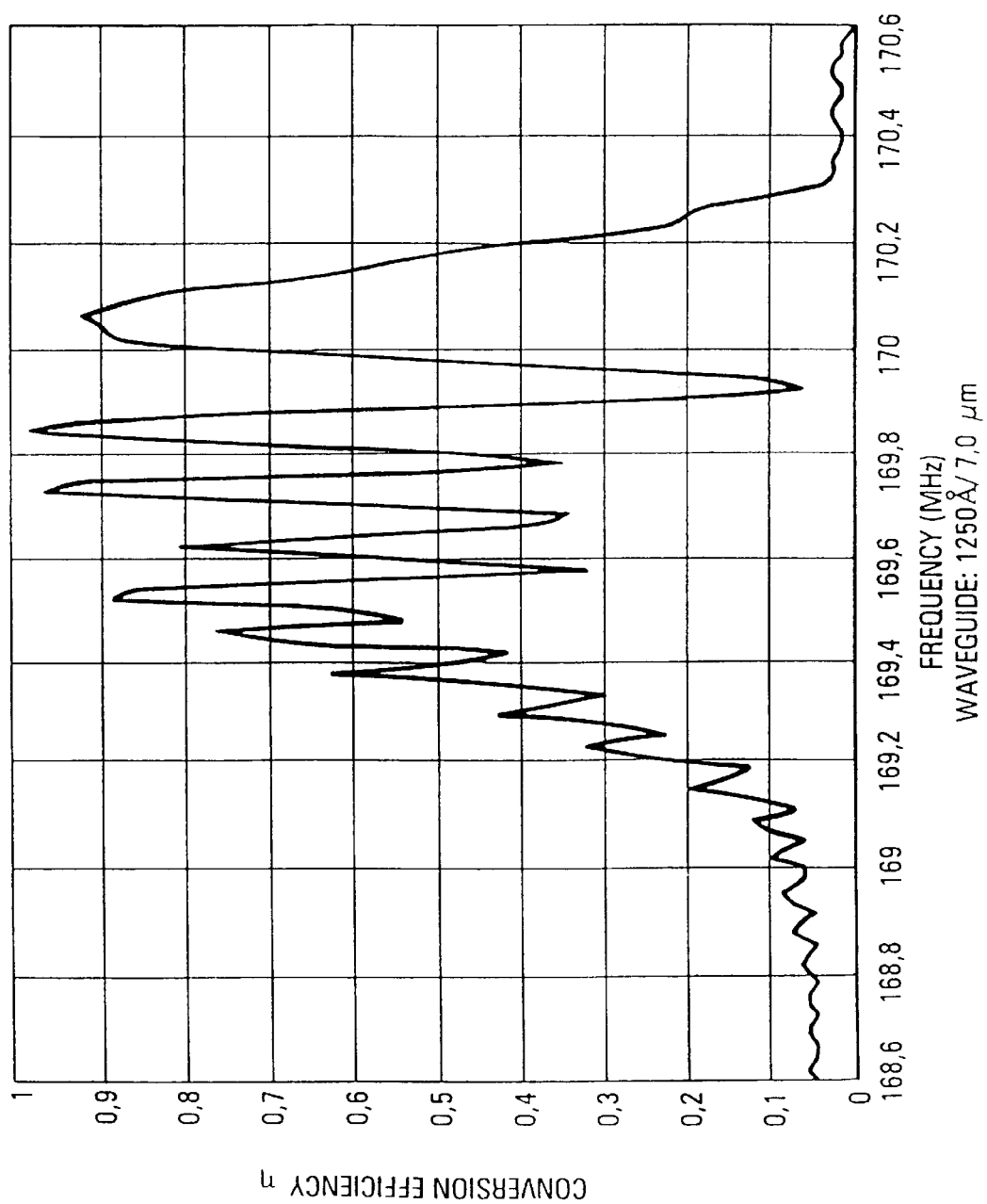
FIG. 4 shows the typical conversion characteristic of a conventional acousto-optical mode converter using an optical waveguide made by indiffusing a Ti stripe of 1250 Å height, 7.0 $\mu$m width and 60 mm length.
Figure 5:
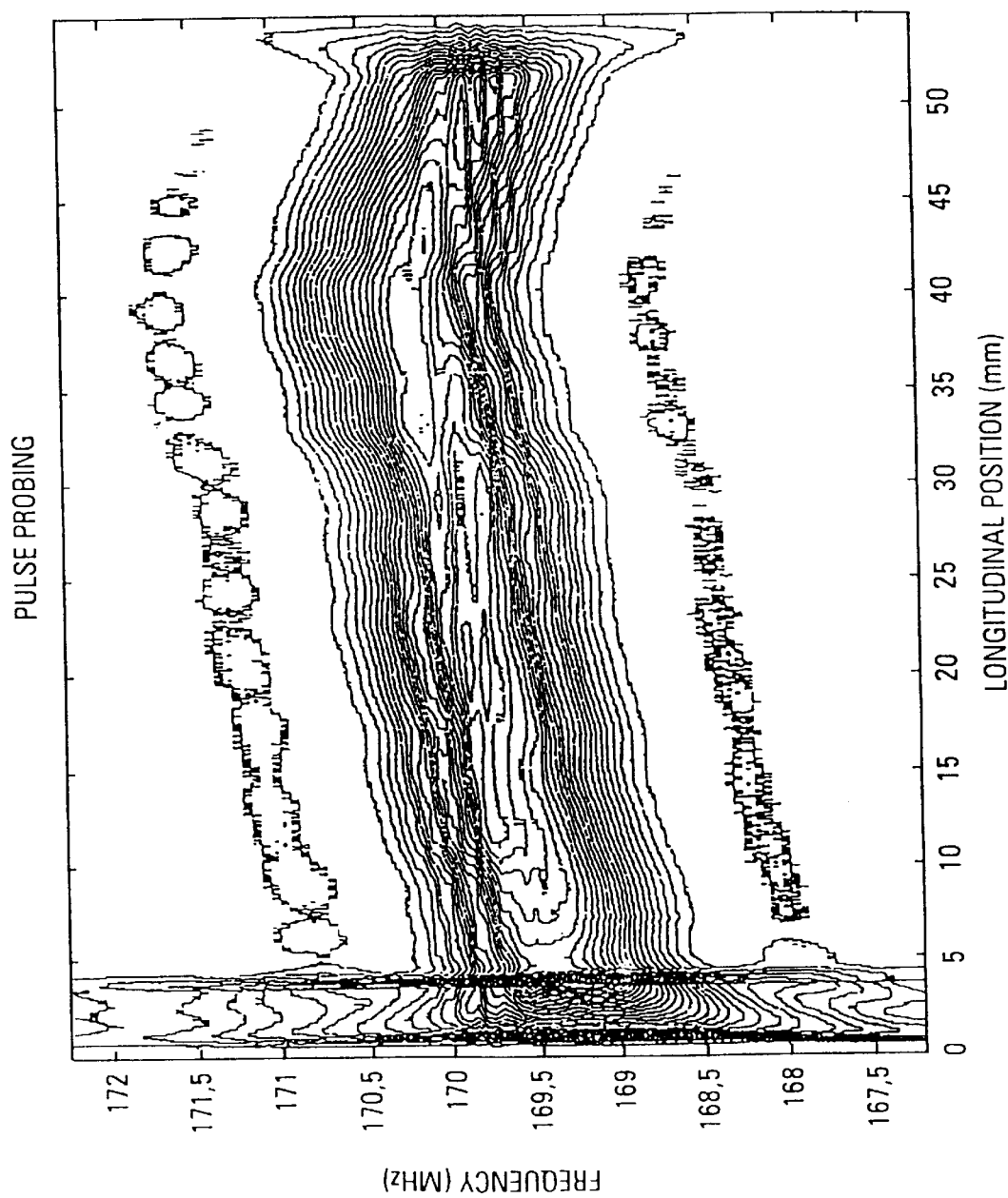
FIG. 5 shows a contour plot of the phase matching frequency (maximum≐100% phase matching) along the acousto-optic mode converter of FIG. 4 indicating a typical birefringence variation along the longitudinal direction of the mode converter.

FIGS. 11a, 11b are analogous to FIGS. 4, 5 (where $\Delta f \approx 800$ KHz corresponding to a birefringence variation along the waveguide of a value $\delta(\Delta n) \approx 3.3 \cdot 10^{-4}$) and show the superior effect of using a 1050 Å/4.5 μm waveguide in the acousto-optical mode converter. FIG. 11a shows that the side lobe suppression is superior (in fact very similar to the theoretical assumption and FIG. 11b indicates that only very minor variations in the order of 100 KHz of the conversion frequency occur along the longitudinal direction of the acousto-optical mode converter. As explained before, the conversion frequency is essentially a measure of the birefringence variation and thus FIG. 11b shows that only a minor variation of the birefringence ($\delta(\Delta n) \approx 0.4 \cdot 10^{-4}$) occurs.

The inventors have clearly realised, that smaller waveguides (independent as to whether they are rib or channel waveguides etc.) perform better than strongly guiding wide waveguides. Since the conditions derived from FIGS. 9 to 12 i.e. "narrow" and "flat" waveguides, automatically means that the optical wave is not strongly guided, an optimisation (i.e. a minimisation) of the waveguide dimensions is limited by the "cut-off" wavelength of the fundamental modes. The "selection of waveguide dimensions (waveguide parameters)" such that the propagation constant is "close to cut-off" can be expressed with respect to the cut-off wavelength of the fundamental mode. If the components are operable in the wavelength window between 1530 nm and 1565 nm, then conventionally used waveguides in acousto-optical mode converters (having a width of 7–8 μm as can be taken from the above mentioned prior art documents) have a cut-off beyond 1750 nm for both TE- and TM-polarisations. According to the invention the expression "optimised waveguide parameters" means, that the lowest cut-off wavelength of the fundamental TM-mode or TE-mode is as close as possible to the upper signal wavelength, but preferably greater than 1570 nm, and smaller than 1650 nm. This is true for straight waveguides. Curved waveguides should be kept broader since the decrease of the cut-off wavelength due to the curvature must be compensated by a larger width (for example, if the straight waveguide has a width of 5.5 μm then a curbed waveguide with Rc=130 mm should have a width of approximately 6.5 μm).

METHOD AND DEVICE FOR MEASURING THE CUT-OFF

Above, the cut-off wavelength is specified as a design criterion which guides the selection of the optical waveguides according to the invention. However, the diffusion profile (i.e. the actual dimension of the waveguide in the substrate) cannot be determined experimentally, such that a cut-off wavelength cannot be calculated from the actual waveguide parameters. Therefore, the cut-off wavelength is measured with a device as shown in FIG. 12a.

Figure 12A:
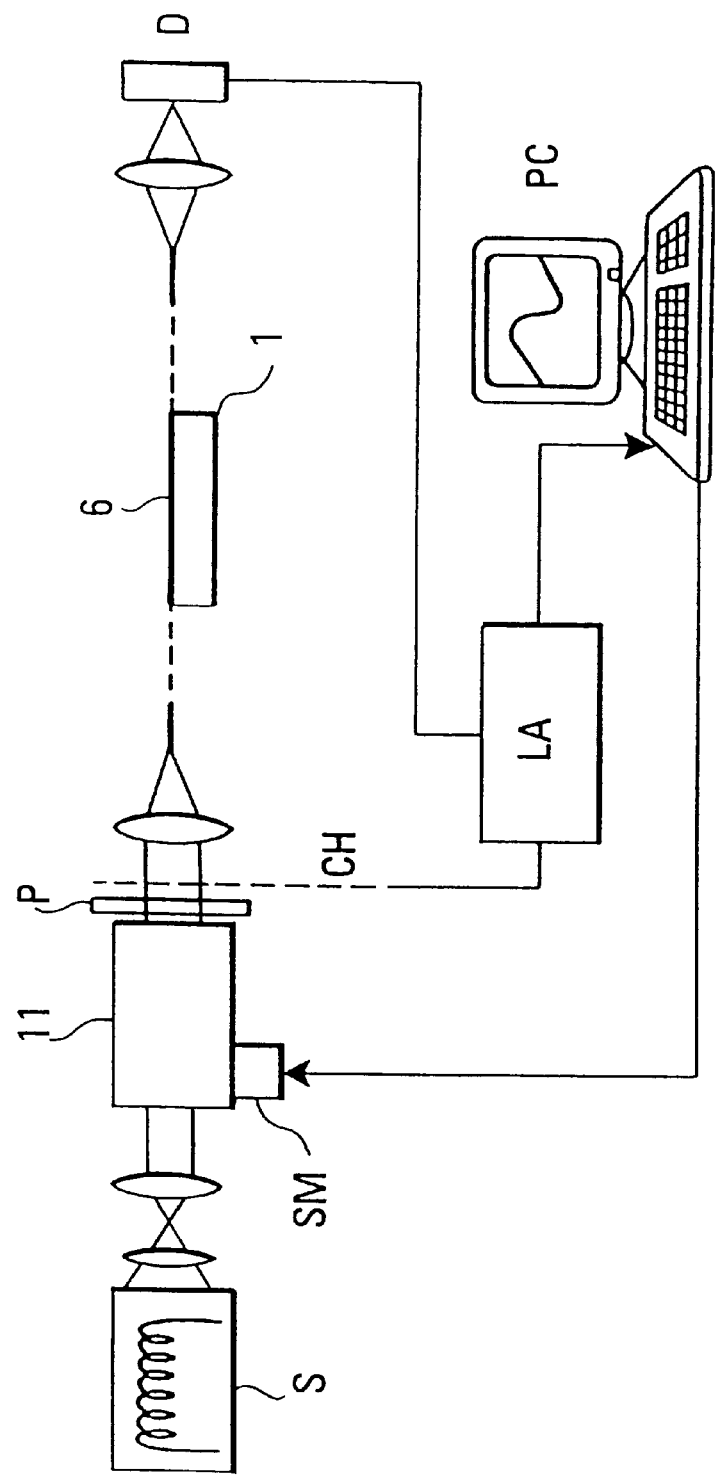
FIG. 12a shows a device for measuring the cut-off wavelength of optical waveguides.

In FIG. 12a, a broadband light source 5 emits light into a monochromator M to which a stepping motor SM is attached such that the output light from the monochromator can be tuned through a predetermined wavelength range. The stepping motor SM is controlled by a control means PC. The light emitted from the monochromator passes through a polariser P in order to emit TE or TM light into the waveguide 6 in the substrate 1. A detector D measures the light intensity and a lock-in amplifier LA which controls a chopper CH provides a signal indicating the received light intensity (amplitude) to the control means PC. Such a device has already been used for the measuring of optical fibers to investigate for example the bending characteristic of the optical fibers ("Fiber Optic Communications Handbook", 2nd edition, Technical Staff of CSELT, edited by F. Tosco, TPR Blue-Ridge Summit, Pa. (US) 1990, pages 390 to 394).

FIG. 12b shows typical attenuation profiles of the fundamental mode for a straight waveguide. The attenuation dB is the logarithm of the ratio between input and output light intensity. For a special choice of waveguide height/width (before indiffusion), the attenuation curves show a steep rise at a certain wavelength. The cut-off wavelength is defined as the wavelength (measured in vacuum) corresponding to a difference of 1 dB from the range where the attenuation is substantially constant, the corresponding to a steep rise of the attenuation profile. The cut-off wavelength is different for the TM, TE fundamental mode. The waveguide under test in FIG. 12b shows a relatively strong difference of attenuation between the two polarizations, i.e. polarization dependent loss (PDL). In a preferred waveguide, however, PDL is preferably less than 0.5 dB on the entire bandwidth 1530–1565 nm. In essence, the steep rise of the attenuation indicates that the fundamental mode cannot be guided any longer, i.e. goes into a cut-off. The same is essentially true for curved waveguides, however a larger width of the dopant stripe before indiffusion should be adopted for the curved portions. The inventors have determined that, for example a 6.5 $\mu$m curved waveguide (Rc=130 nm) has similar cut-off properties then a 5.5 $\mu$m straight waveguide.

Figure 12C:
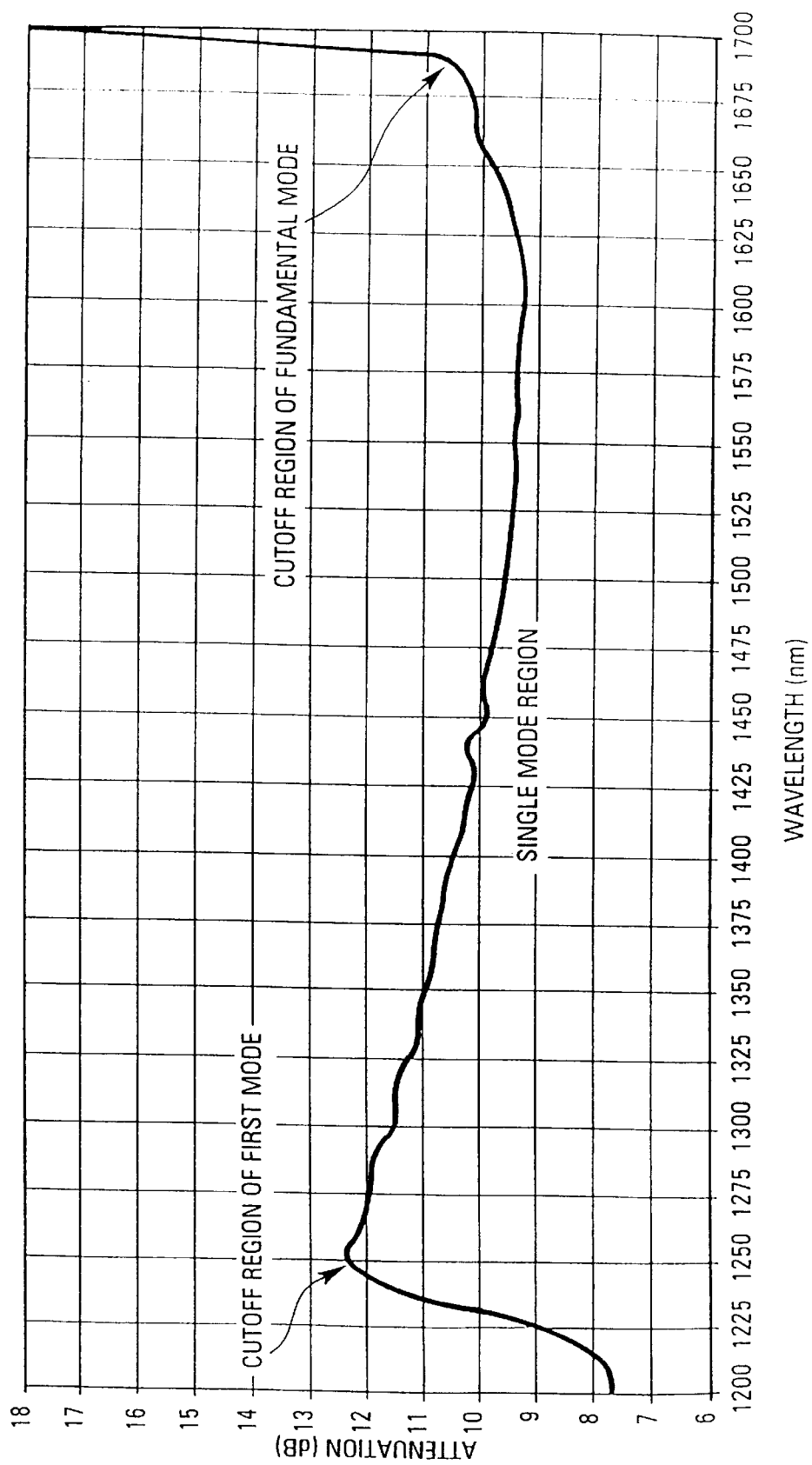

FIG. 12c shows a similar measurement over a broader wavelength range and here the respective steep rises of the attenuation curves indicate the cut-off region of the first mode and the cut-off region of the fundamental mode respectively for a specific choice of waveguide parameters. Obviously, the region between the cut-off region of the fundamental mode and the cut-off region of the first mode designates the "single mode region".

Figure 12F:
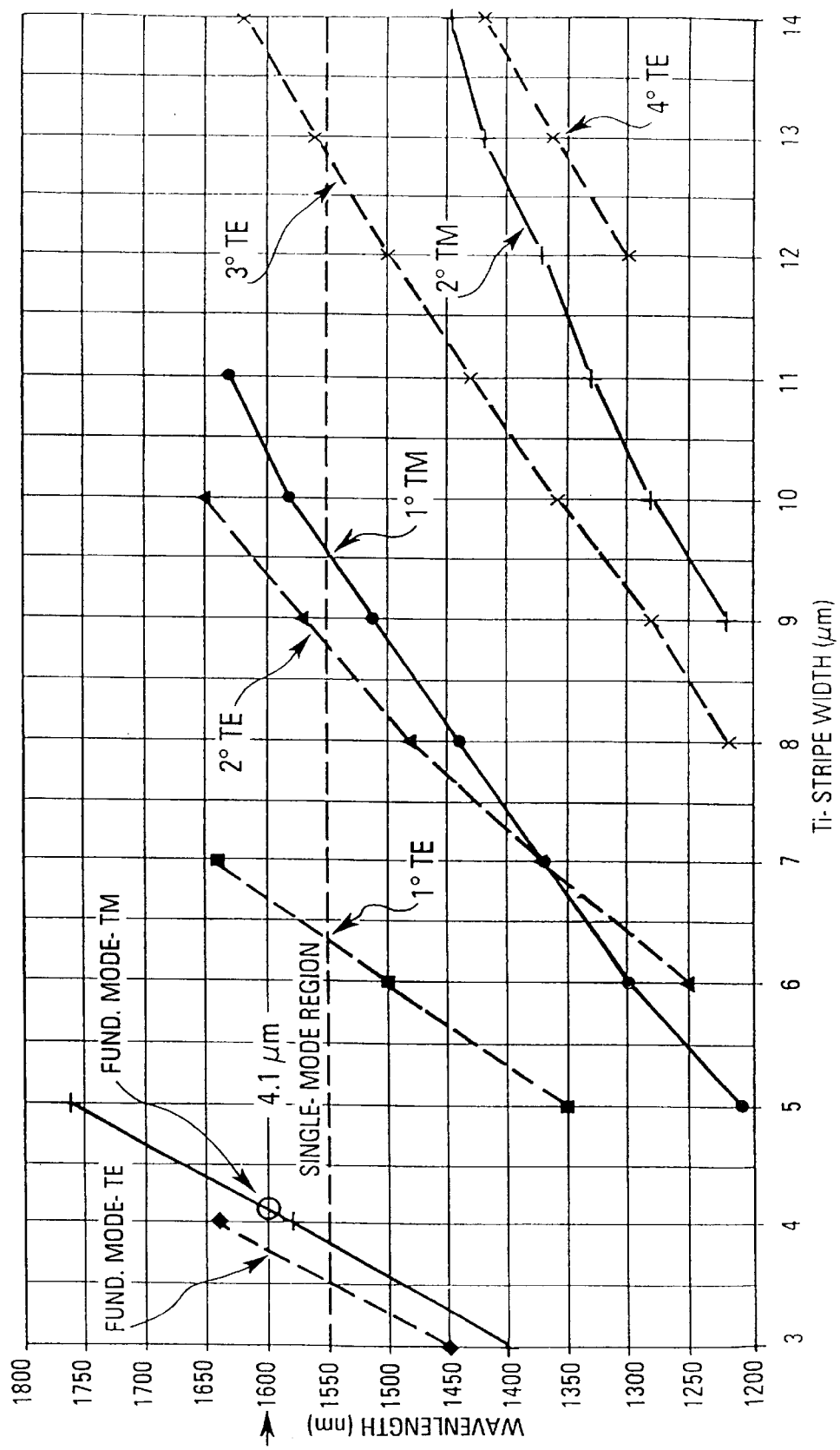

FIGS. 12d, 12e, 12f show the measured cut-off wavelength (according to the definition in FIG. 12b) for modes of different order and for different Ti-stripe widths and Ti-stripe thickness (before indiffusion). In FIGS. 12d, 12e, 12f, also the threshold value of 1550 nm is indicated. Considering FIG. 12d, for a Ti-stripe thickness of 1050 Å, the lowest cut-off wavelength occurs for the TM-mode in the single-mode region. A value of 1600 nm for the cut-off wavelength is reached at a Ti-stripe width of 5.2 $\mu$m.

FIGS. 12e, 12f show similar considerations for other stripe thicknesses, such that the following preferential values are established:

1050 Å: 5.2 $\mu$m (5.5 $\mu$m)
1150 Å: 4.5 $\mu$m (4.8 $\mu$m)
1250 Å: 4.1 $\mu$m (4.4 $\mu$m)

The first mentioned values are the "ideal values" for the three examples and the values in brackets are values for an increased tolerance which take into account process variations. Even if one allows typical fabrication and measurement tolerances to cause a deviation of the measured cut-off wavelength $\lambda_{max}$=1600 nm, an optimised waveguide should have a cut-off wavelength of 1570 nm to 1650 nm. Such a relationship generally holds independent of the type of waveguide used. Comparing the values of FIGS. 12d, 12e, 12f with the requirements already discussed in FIG. 9a, it can be seen that for the values given in FIGS. 12d, 12e, 12f, the birefringence variation is small and the mode is in the single-mode region near the specified cut-off wavelength. Therefore, it has been shown that with such general values of the Ti-stripe thickness and width before indiffusion, optical waveguides are designed such that the propagation constant or the normalised frequency of the fundamental mode is respectively close to the cut-off condition.

For example, assuming a propagating wavelength in the wavelength window in the spectral region around 1550 nm, to guarantee a sufficiently flat attenuation profile over the operating wavelength range, the waveguide parameters are preferably chosen such that the window upper wavelength (i.e. the highest useful propagating wavelength) is not less than 30 nm away form the cut-off wavelength as defined according to the above described method. However, the window uppwer wavelength can be less than 30 nm away from the cut-off wavelength. Such modes are then not very strongly guided, since they are near cut-off, however, there if a significant improvement in the birefringence variation (see FIG. 9a).

In order to limit birefringence variation, the window upper wavelenght is preferably not more than 85 nm away upper wavelength form the cut-off wavelenght. Using optical waveguides having the afore mentioned waveguide parameters (having the afore mentioned condition of the cut-off wavelength) in an acousto-optical mode converter, a superior stability of the conversion frequency can be obtained, since there is a smaller variation of birefringence with respect to a change of fabrication parameters during the fabrication. That is, if the optical waveguide fulfils the afore mentioned requirement, there can still be small changes in the waveguide parameters during the fabrication and nonetheless the overall birefringent variation does not change so drastically as is the case with large (wide and deep) waveguides.

The superior effect of reducing the birefringent variation dependency on the waveguide parameters can be intuitively explained as follows. The effective optical birefringence is a combination of the intrinsic birefringence of the material LiNbO$_3$, $\Delta n_{eff}$=0,072) as well as the waveguide birefringence which is determined substantially by the waveguide dimensions.

Figure 12G:
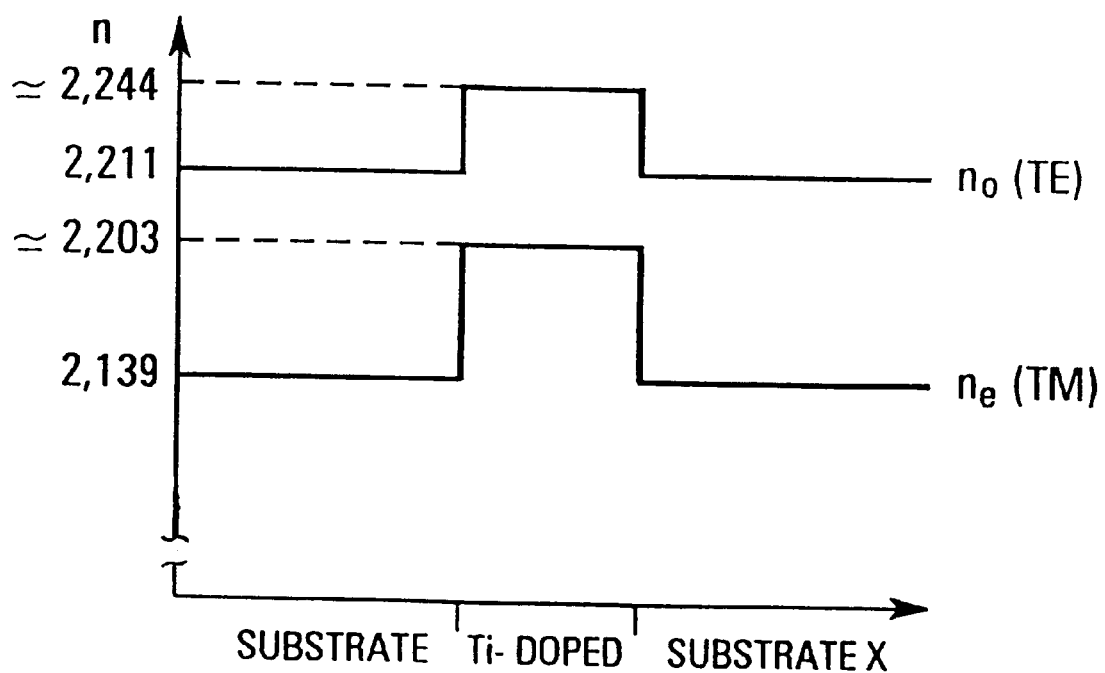
FIG. 12g shows typical refractive indices of undoped and Ti-doped $LiNbO_3$.

FIG. 12g shows such typical refractive indices of undoped and Ti-doped LiNbO$_3$ (x-cut, depth=1200 Å Ti). The real profile due to the indiffusion is of course not rectangular, but dependent on the diffusion characteristics, e.g. they are Gaussian-like. The Ti-diffusion raises the ordinary index $n_o$ of a smaller amount in comparison to the extraordinary index $n_e$. That is, the "wider" and "deeper" the waveguide is, the stronger its contribution to the effective birefringence will be.

All local changes of the waveguide dimensions, which are for example caused by an inhomogeneity of the fabrication process (fluctuation in the Ti-stripe width layer thickness, diffusion temperature, etc.), result in local changes of the waveguide birefringence and thus in changes of the phase matching condition (Bragg-Condition). The "smaller" the contribution of the waveguide birefringence is to the total birefringence the smaller is the effect on the total birefringence caused by an absolute equal change of waveguide dimensions.

Thus, weakly guided waves (modes whose propagation constant is near cut-off as much as possible) are with respect to the effective refractive index less sensitive against changes in the waveguide dimensions than strongly guided waves are, something that is implicitly shown in FIGS. 9 to 12.

FABRICATION OF SINGLE MODE BIREFRINGENT WAVEGUIDES

Hereinafter, a method for manufacturing an optical waveguide according to the invention will be described with reference to FIG. 13.

Figure 13A:
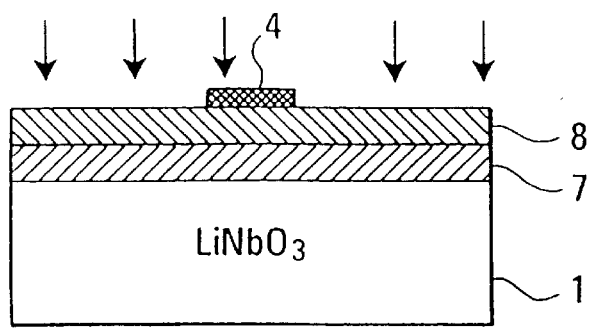
FIGS. 13a–13e shows a method for making a diffused optical waveguide according to the invention.

In FIG. 13a, a Ti metal layer 7 is deposited on a substrate 1, preferably made from $LiNbO_3$. A standard positive photoresist 8 is deposited on the Ti metal layer 7. Using a mask having a waveguide pattern 4, the positive photoresist is exposed and subsequently, the exposed and developed portions of the positive photoresist 8 are removed by conventional means to result in the structure of FIG. 13b.

Figure 13B:
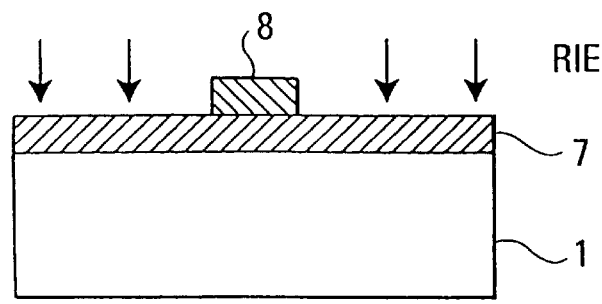
Figure 13C:
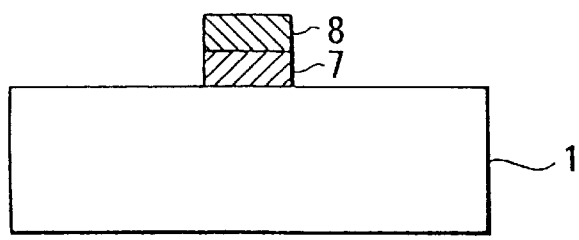
Figure 13D:
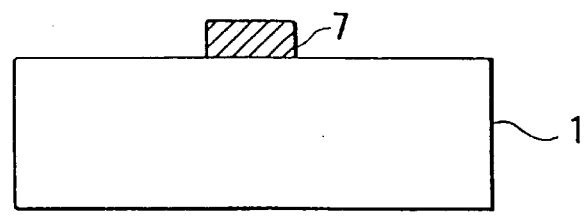
Figure 13E:
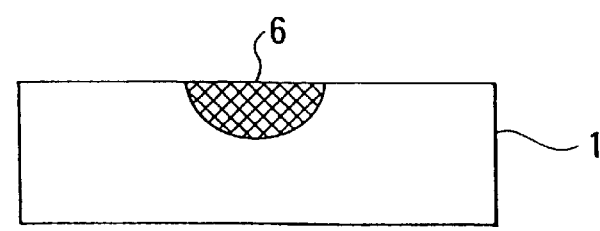

In FIG. 13b a dry etching technique (for example reactive ion etching) etches away the portions of the Ti layer which are not covered by the remaining photoresist 8. This results in the structure of FIG. 13c. As is seen in FIG. 13c the very accurate dry etching technique (for example using reactive ion etching RIE) produces no substantial under etchings or undercuts, such that the Ti layer dimensions on the substrate 1 can be maintained substantially equal to the desired dimensions prescribed by the mask pattern 4. Then the remaining resist 8 is removed to result in the structure of FIG. 13d. As in the conventional method, an indiffusion of the Ti stripe 7 into the substrate 1 is performed to result in the optical waveguide 6 as is shown in FIG. 13e. It should also be noted that the method and the waveguides as well as the devices according to the invention are not restricted to the usage of the metal layer 7 made of Ti but also non-metal layers 7 e.g. made of titanium dioxide are usable.

The dry etching techniques are etching techniques that do not make use of liquid etchants. The dry etching techniques comprise ion bombardmemt techniques (where the etching effect is due to an ion bombardment) and chemical/physical techniques (where the etching effect is partially due to an ion bombardment and partially due to a chemical effect). Examples of the ion bombardment techniques is the sputter-etch technique and the ion-milling technique. Techniques that belong to the chemical/physical techniques are the downstream plasma reactor, the electron-cyclotron resonance and the reactive ion etching. The reactive ion etching may use a fluor gas such as $CF_4$, $SF_6$ and $CHF_3$ or a chlorine gas such as $Cl_2$ or $SiCl_4$. All the above described dry etching techniques can be used for etching away the portions of the Ti layer in FIG. 13b. A preferred dry etching technique employed in FIG. 13b is the reactive ion etching technique where an ionized gas etchant (plasma) provides an etching effect due to the combination of a mechanical effect (ion bombardment) and a chemical effect.

It is important to note that the method in FIG. 13 can obtain a Ti stripe on the substrate 1 before indiffusion which has a width which corresponds to the desired value in a highly reproducible manner and very accurately. Therefore, if for example the waveguide width is chosen as shown in FIGS. 12d, 12e, 12f, then the method according to FIG. 13 ensures that the chosen waveguide width is obtained in a reproducible way and very accurately. Of course other parameters like the diffusion temperature and the diffusion time will influence the actual geometry of the waveguide. However, as the width is found to be the most critical parameter, improvement in the width accuracy and reproducibility is of great importance in practical devices.

Although the description so far has only considered the properties of the indiffused optical waveguides with respect to the birefringence variations, it should be noted that the manufacturing method in FIG. 13 is generally applicable to the formation of any indiffused waveguide and the invention is not restricted to the particular substrate material made of a birefringent material such as $LiNbO_3$.

The manufacturing method in FIG. 13 is advantageous for the formation of any kind of indiffused waveguide (or optical component using an optical waveguide) needing very precisely controlled stripe width dimensions before the indiffusion. Of course, the manufacturing method is particularly advantageous when optical waveguides are to be manufactured which need highly precisely controlled waveguide dimensions, like those waveguides used in the acousto-optic devices, since here a small change in waveguide dimensions may already cause a cut-off and in general also a multimode behavior of the waveguide, which is to be avoided.

It should also be noted that all teachings above regarding the cut-off wavelength and the manufacturing method are generally applicable to other components involving optical waveguides in addition to the acousto-optical devices.

As an example, waveguide polarization splitters on a birefringent substrate, or evanescent wave couplers on a planar substrate may greatly benefit from the invention. In addition to acousto-optical devices, these components are used e.g. in dual output Mach-Zehnder interferometers and electrooptical switches.

To illustrate the accuracy of the method in FIG. 13 in comparison to the method of FIG. 8, the inventors found typical tolerances of the lift-off method to be $\Delta w = \pm 0.5$ $\mu m$ and $\Delta \tau = \pm 50$ Å, whilst the typical tolerances in the preferred reactive ion etching technique were found to be $\Delta w = \pm 0.1$ $\mu m$ and $\Delta \tau = \pm 30$ Å.

SINGLE MODE BEHAVIOUR OF THE DIFFUSED WAVEGUIDES

Figure 14A:
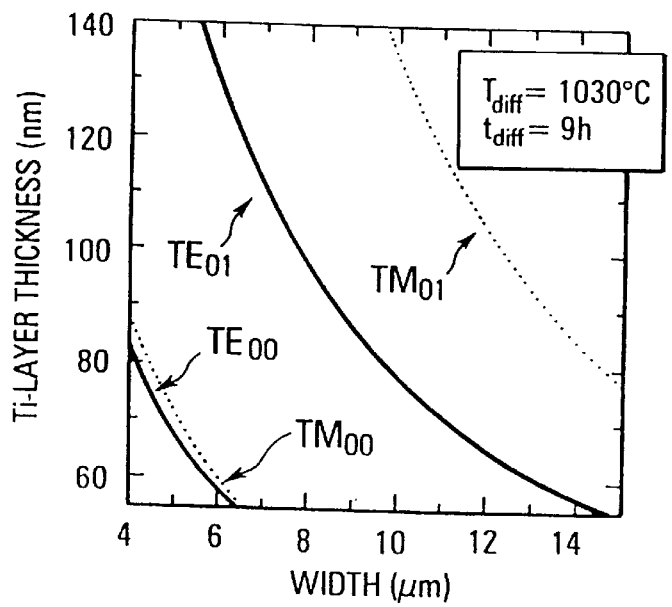
FIGS. 14a–14b show the dependency of the cut-off condition with respect to the waveguide thickness, waveguide width and diffusion temperature.
Figure 14B:
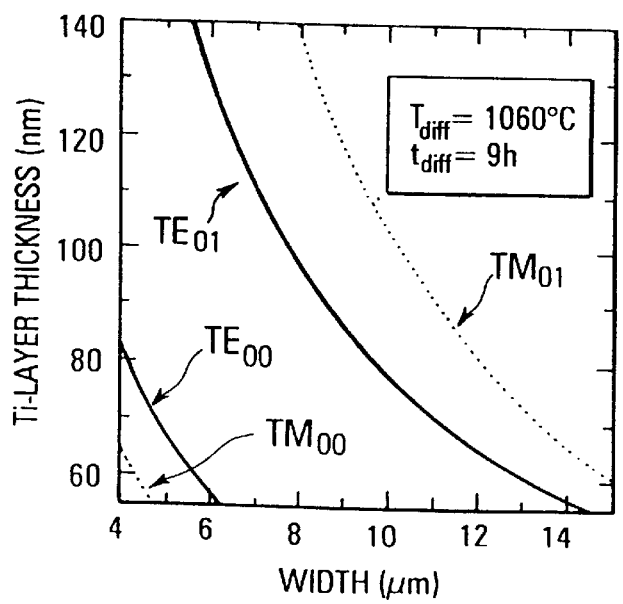

FIG. 14a and FIG. 14b respectively show the cut-off regions of a diffused waveguide in an x-cut $LiNbO_3$ substrate with respect to the width and thickness. It is seen that using a slightly higher indiffusion temperature of $T_{diff}=1060°$ C. (assuming the same diffusion time of 9 h) the cut-off regions for the fundamental $TE_{00}$ and $TM_{00}$ modes move to waveguide parameters of smaller width and smaller thickness.

This is exactly what is aimed at to provide a smaller birefringence variation in the optical guide. That is, the condition that the waveguide is as small (thin and narrow) as possible to reduce the influence of the waveguide birefringence to the total birefringence can be obtained with diffusion temperatures of greater than $T_{diff}=1030°$ C., i.e. $T_{diff}=1060°$ C.

Whilst FIGS. 14a, 14b show calculated values of the cut-off conditions, it has been found via experiments that the waveguides normally show a weaker guiding than predicted from the model. Quite a reasonable agreement between experimentally obtained and calculated results can be achieved, if the Ti-layer thickness chosen for the calculations is reduced to about preferably 70% of the experimental value. In this case the indiffused waveguide assumes parameter values corresponding to the theoretical design values.

BIREFRINGENCE VARIATION AND FABRICATION PARAMETERS

Figure 15A:
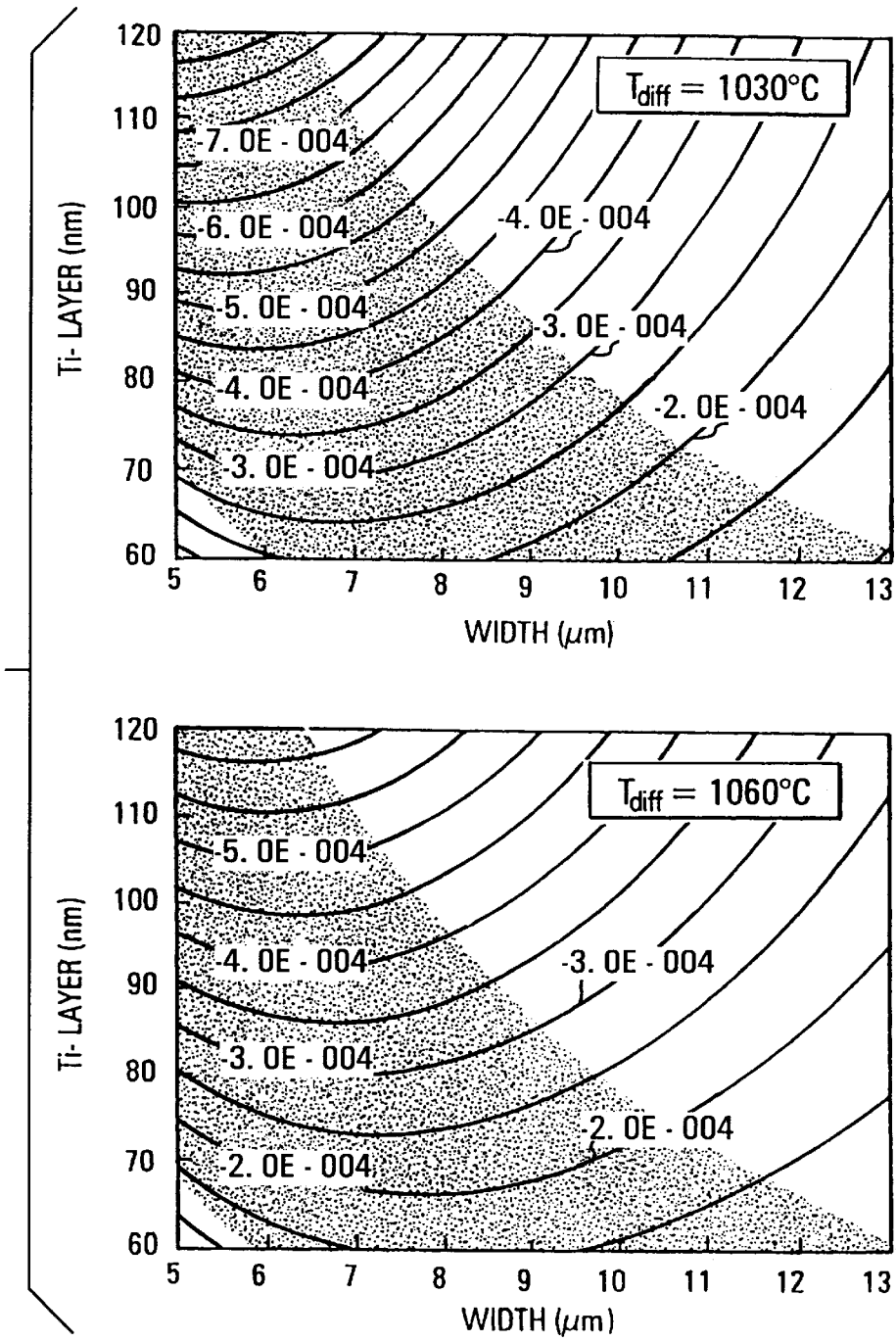
FIGS. 15a–15d show the variation of the effective birefringence with respect to changes of the waveguide parameters.
Figure 15B:
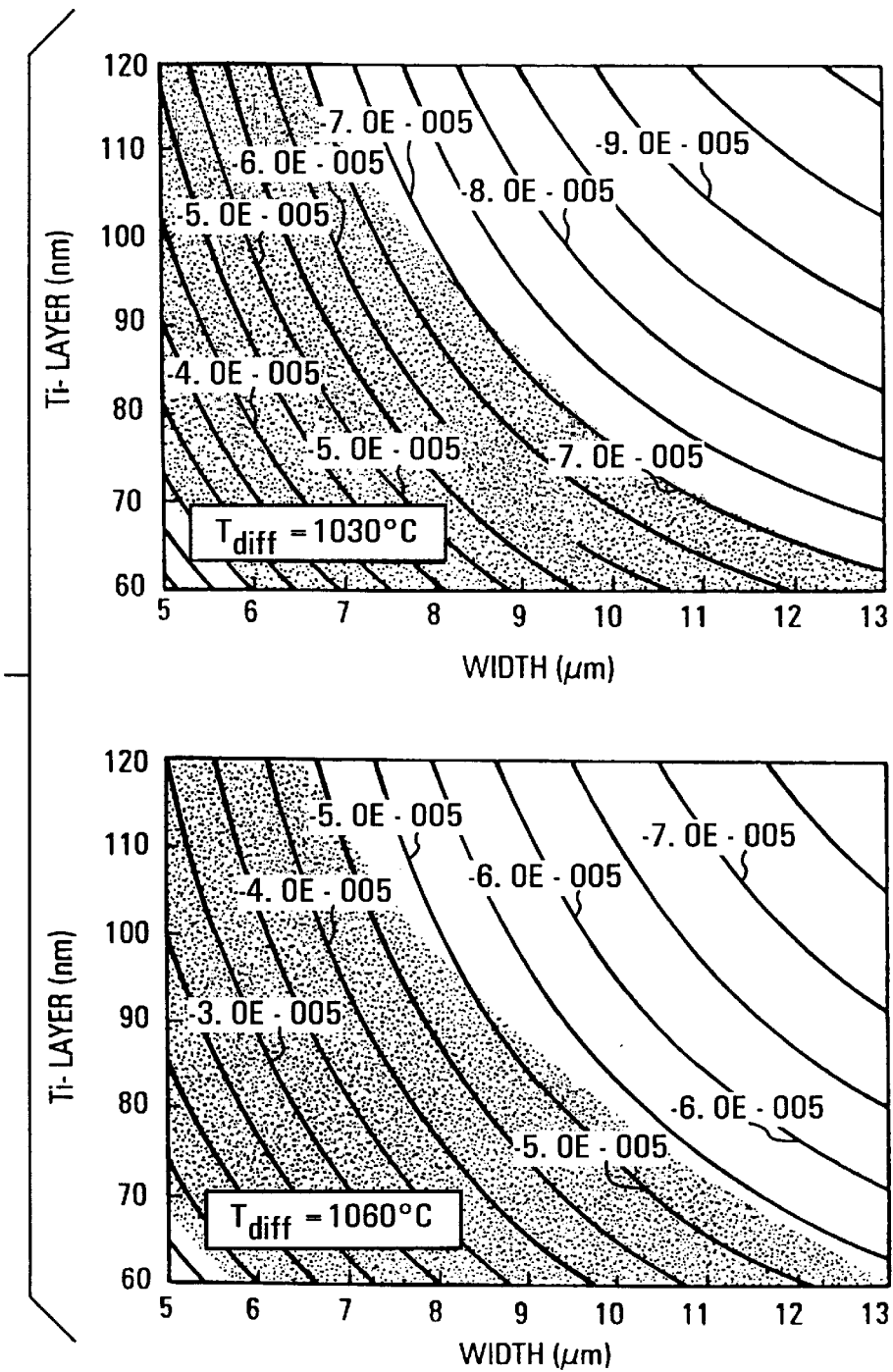
Figure 15C:
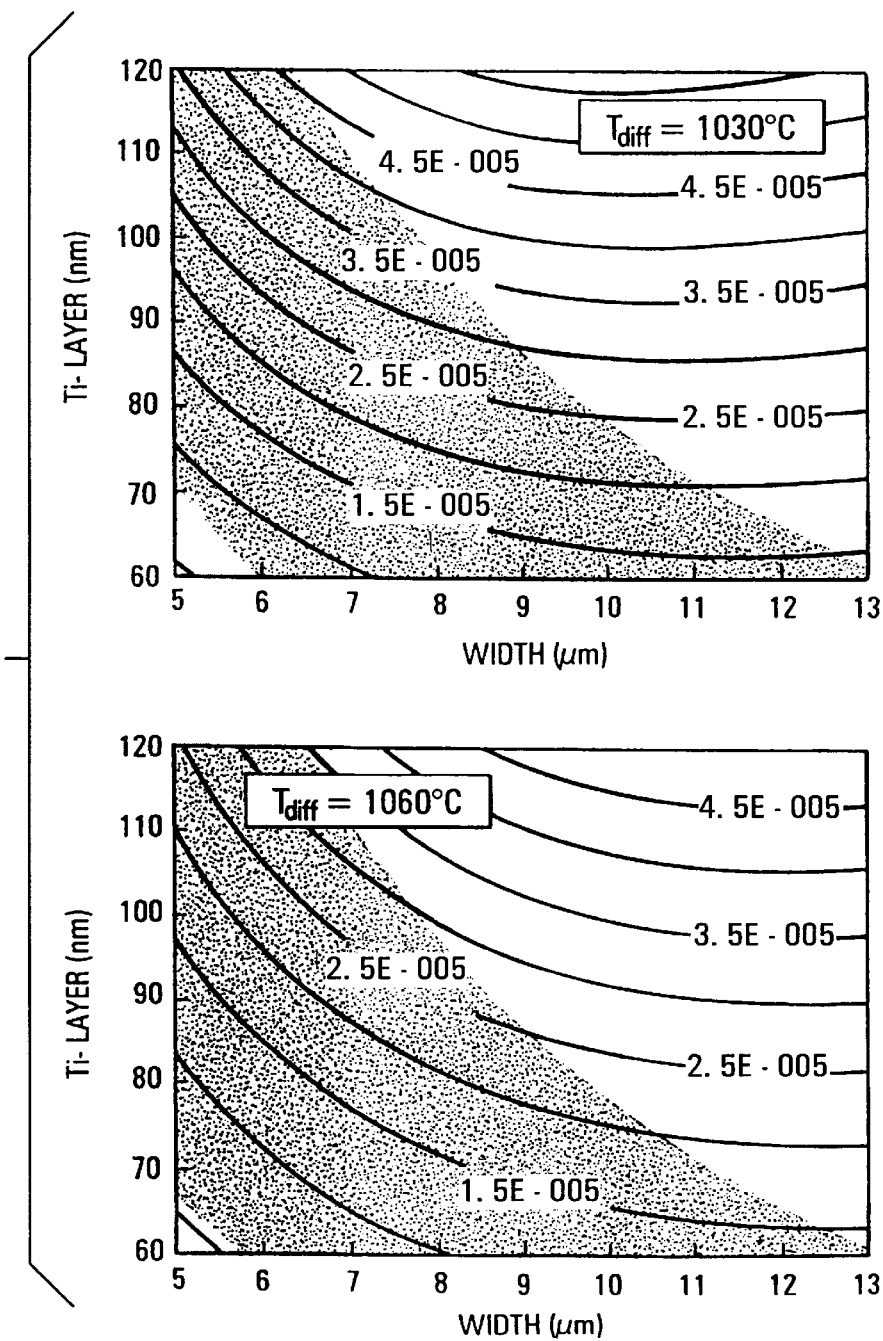

FIGS. 15a, 15b and 15c respectively show the calculated derivatives of the effective birefringence with respect to the Ti-stripe width, Ti-layer thickness and the diffusion temperature respectively. The result are plotted as topographical diagrams as a function of the Ti-stripe width and the Ti layer thickness for a 9 h long diffusion at 1030° C. (upper diagrams) and 1060° C. (lower diagrams). The monomodal region is designated with the shaded regions.

The birefringence variation with a stripe width is stronger for the 1030° C. diffusion than for the 1060° C. diffusion. For narrow stripes with large Ti-layer thickness the derivative is about a factor of 4 to 5 larger than that for wide stripes with small Ti-layer thickness. The absolute values are all in the order of $10^{-4}$ $\mu m^{-1}$. Therefore, for birefringent variation smaller than $10^{-5}$, the stripe variations must be $\Delta w < 0.1$ $\mu m$.

In FIG. 15b the plot for the layer thickness derivative is shown. The values vary from $-2 \times 10^{-5}$ $nm^{-1}$ to $-1 \times 10^{4}$ $nm^{-1}$. For the diffusion at 1060° C. the values are slightly lower in absolute value than that for 1030° C. With large stripe widths the absolute values increase. To maintain a birefringence variation below $10^{-5}$, the Ti-layer thickness should not vary more than about 0.2 nm.

The effect of diffusion temperature variations on the waveguide birefringence are summarised in FIG. 15c. There is no significant difference between the result for 1030° C. and 1060° C. However, again the lowest values are obtained at small Ti-layer thickness.

Assuming that the variation of the individual fabrication parameters of stripe width W Ti-layer thickness $\tau$ and diffusion temperature $T_{diff}$ are independent from each other, but invariably occur during the manufacture process, an average birefringent variation $\overline{\delta(\Delta n)}$ can be defined according to the following equation (5):

$$\overline{\delta(\Delta n)} = \sqrt{\left(\frac{\partial \Delta n}{\partial W}\Delta W\right)^3 + \left(\frac{\partial \Delta n}{\partial \tau}\Delta \tau\right)^2 + \left(\frac{\partial \Delta n}{\partial T_{diff}}\Delta T_{diff}\right)^3} \quad (5)$$

$\Delta W$, $\Delta \tau$ and $\Delta T_{diff}$ are the variations of the stripe width, a layer thickness and diffusion temperature respectively, while the materials of the substrate and the waveguide are kept constant ($LiNbO_3$ and Ti). These parameters depend on the fabrication process and the used equipment and therefore the parameters must be determined by measurements.

Figure 15D:
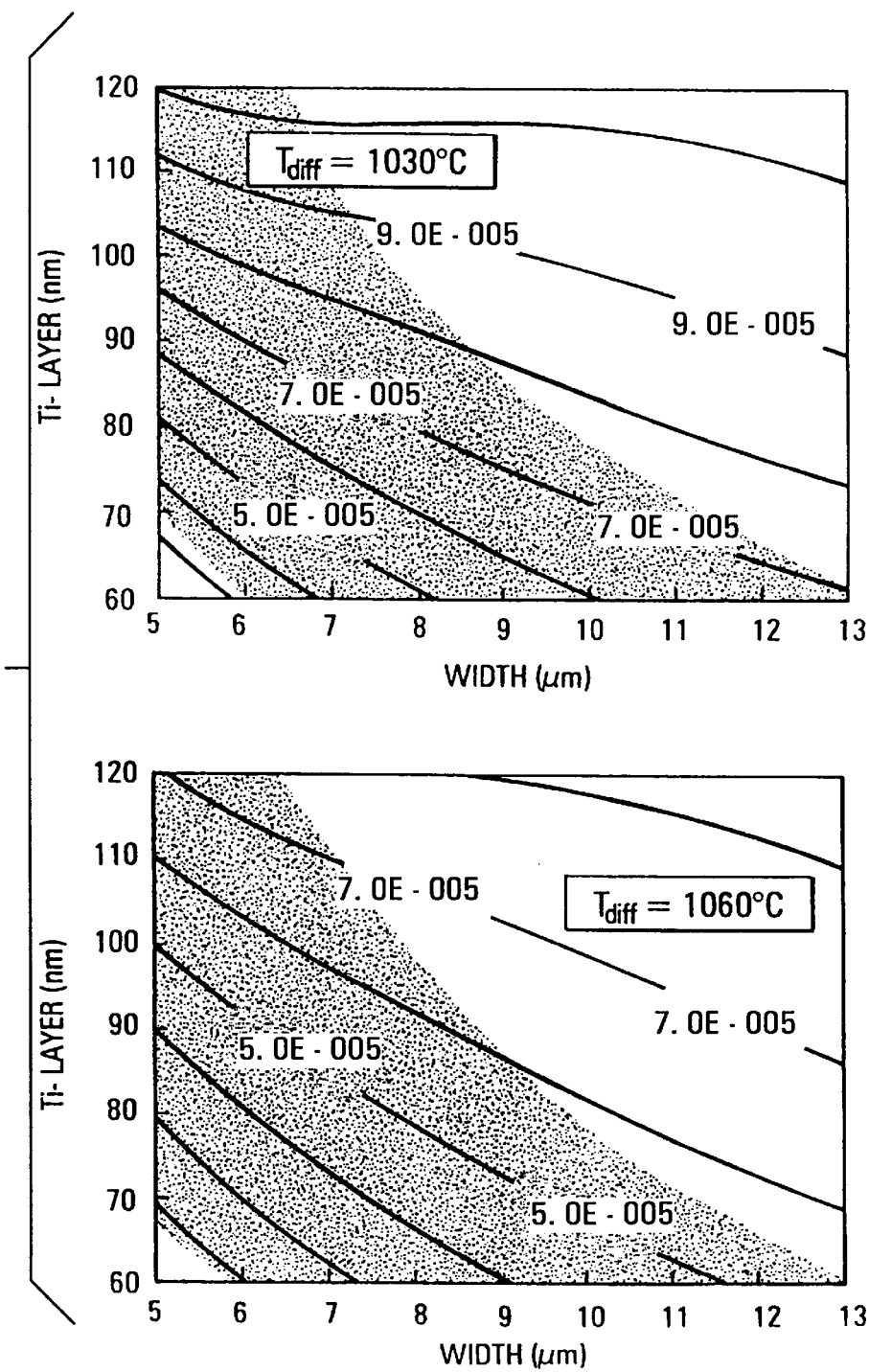

In FIG. 15d the average birefringence variation is shown against the stripe width and layer thickness is shown. For the calculation a stripe width variation of $\Delta W=0.1$ $\mu m$ and a Ti-layer thickness variation of $\Delta \tau=1$ nm has been assumed. Furthermore, a variation of the diffusion temperature has been neglected. Within the single mode-range for the waveguide $\overline{\delta(\Delta n)}$ varies about a factor of 2. As can be seen from FIG. 15d optimised waveguide parameters are small stripe widths and low Ti concentrations. A significant improvement is seen when considering a diffusion at 1060° C. (see lines for $7*10^{-5}$ and $5*10^{-5}$), roughly a factor of 1.4.

What one can derive from FIG. 15(a)–(d) is the following. The optical waveguide to be used in the acousto-optical mode converter should be diffused at a higher diffusion temperature of preferably $T_{diff}=10\alpha°$ C. and with small waveguide widths and thicknesses that would still allow a single mode propagation. This is so since the lowest values of the birefringent variation always occur at the smallest waveguide width and smallest waveguide thickness.

EXAMPLES

Hereinafter, some examples of experiments will be discussed with reference to FIGS. 16a–f and FIGS. 17a–b.

Figure 16A:
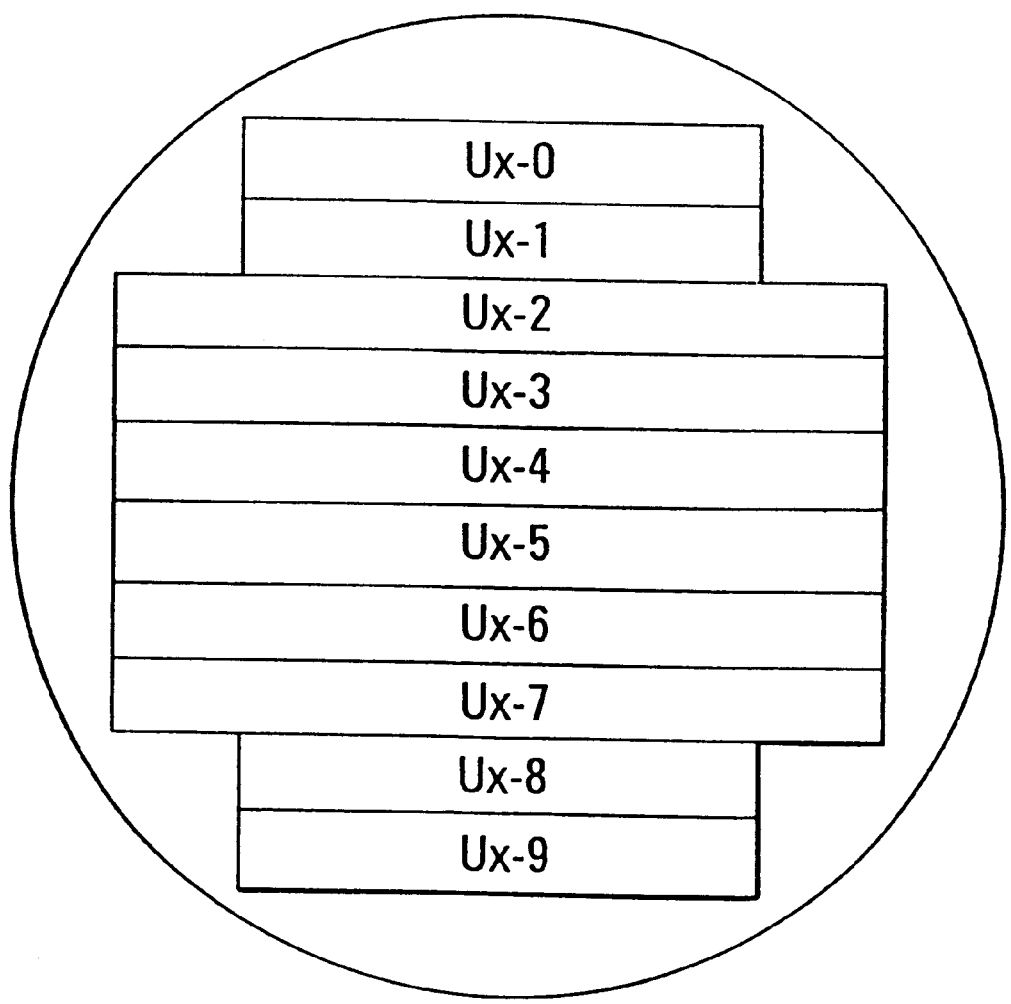
FIGS. 16a–16b show examples of a wafer with optical waveguides and acousto-optical devices according to the invention.
Figure 16B:
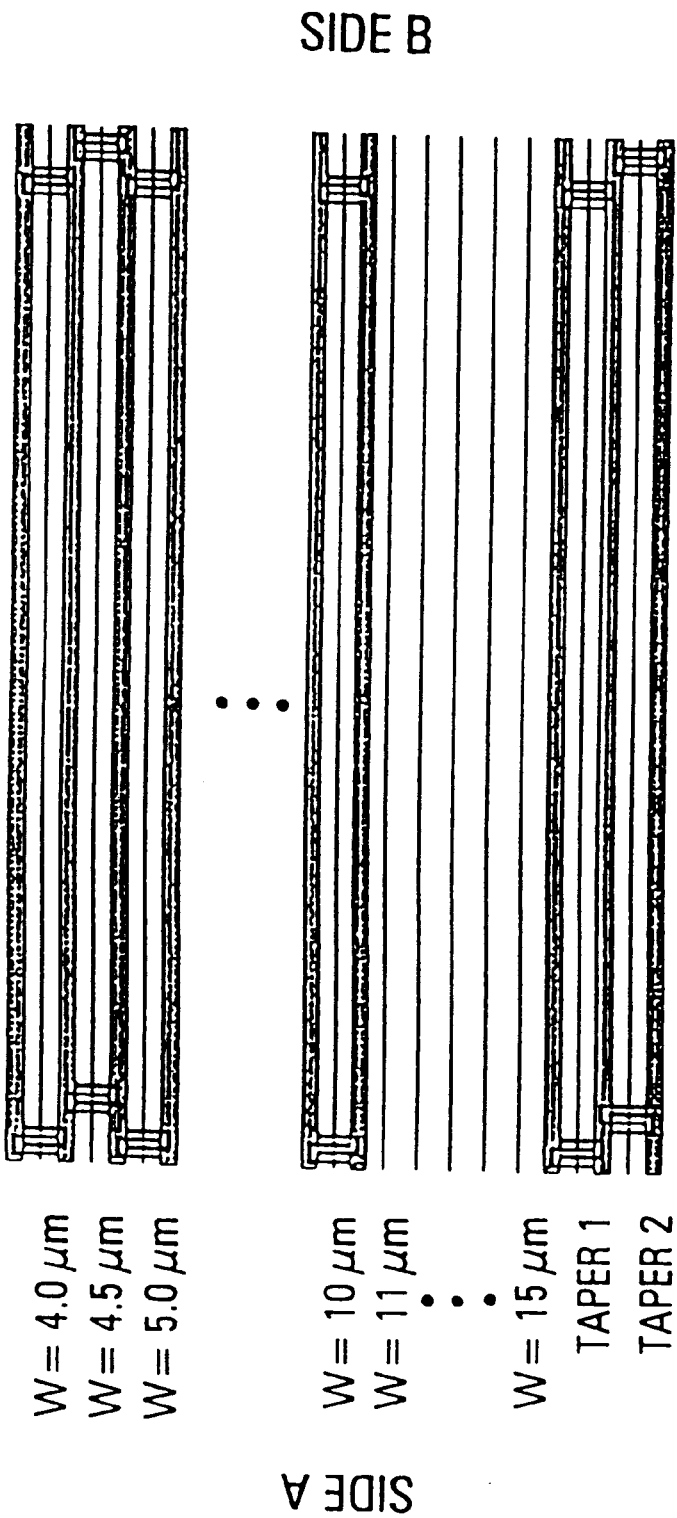
Figure 16C:
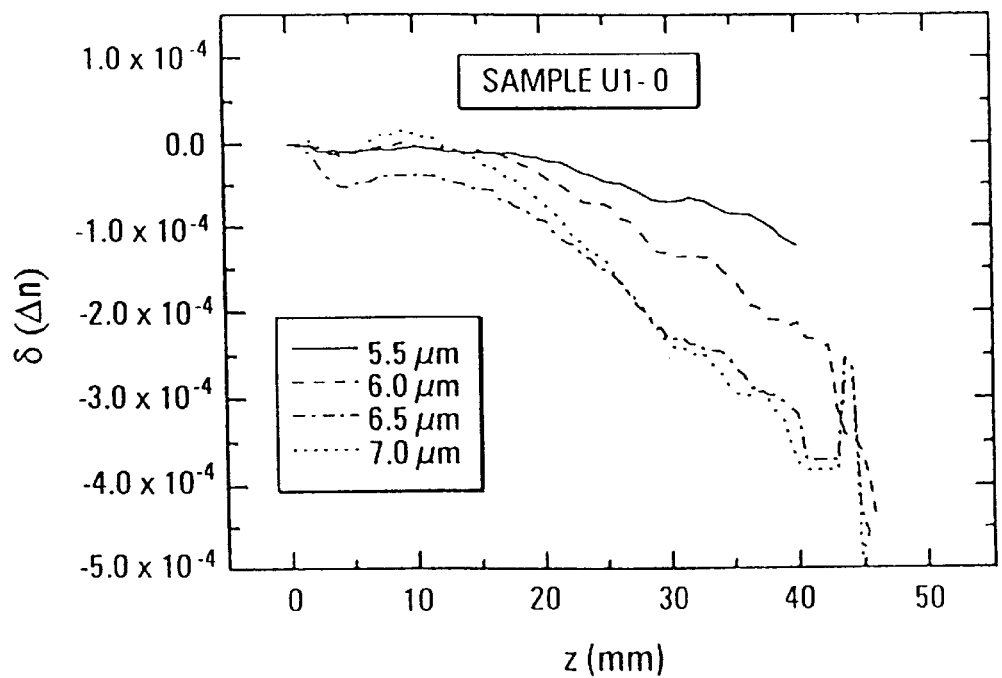
FIGS. 16c–16f show measured birefringent variations in several waveguides of the sample of FIG. 16a along a longitudinal direction thereof.
Figure 16D:
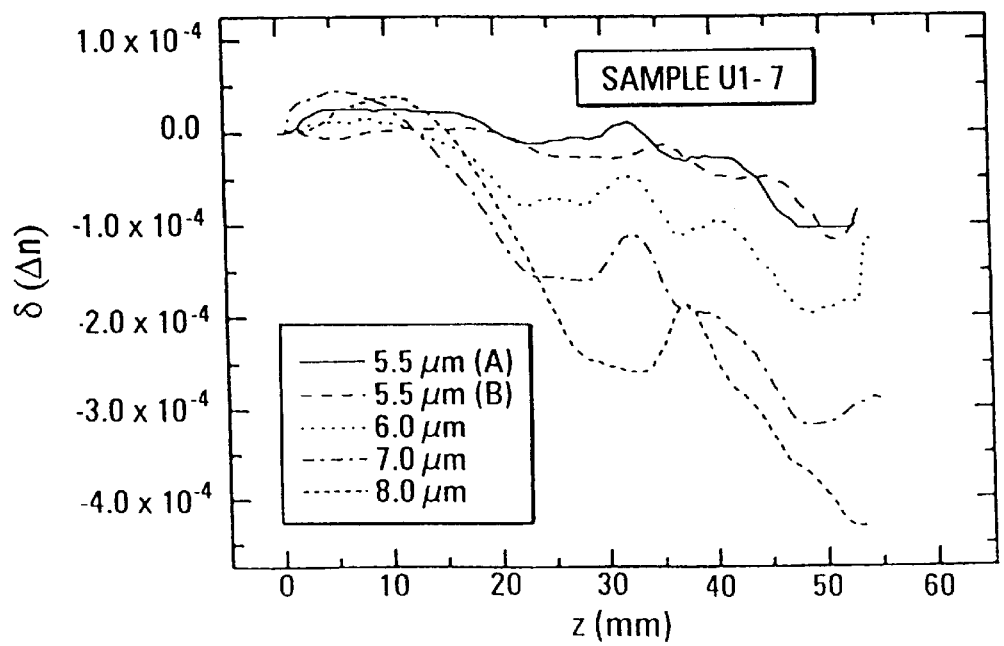
Figure 16E:
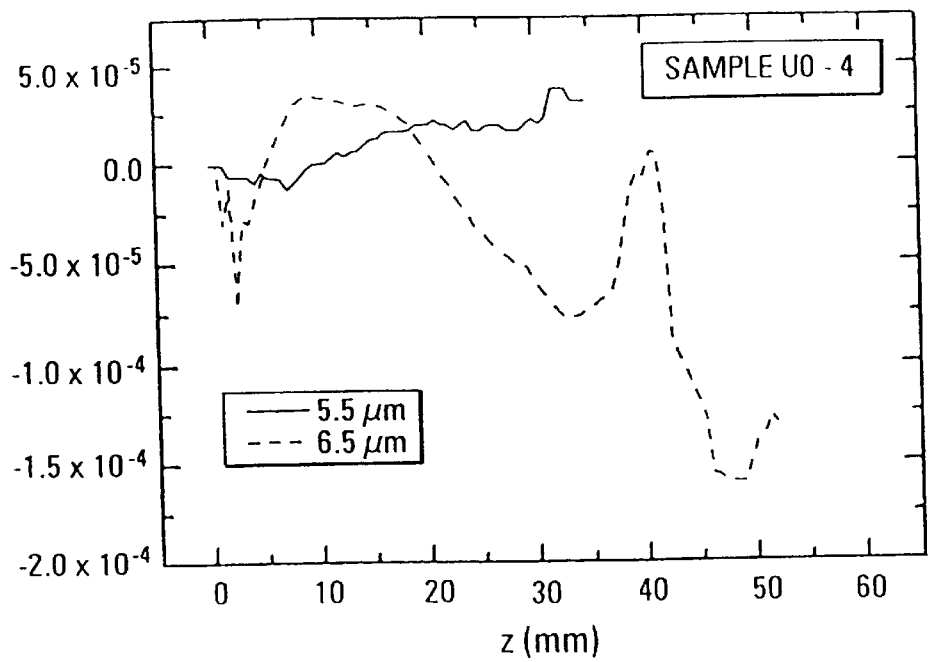
Figure 16F:
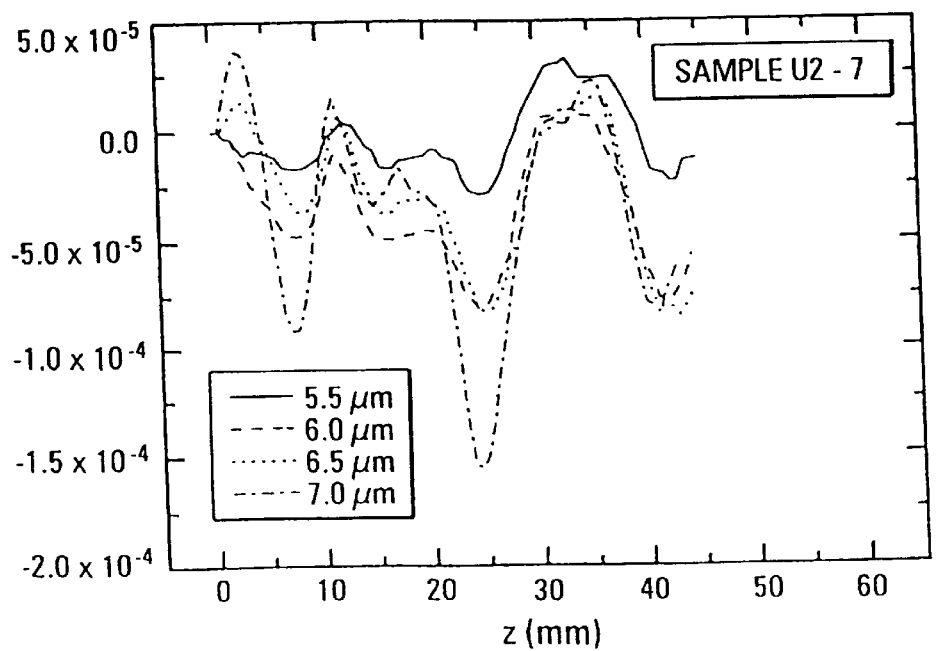

The mode converters consist of an optical waveguide embedded in a 100 $\mu m$ wide straight acoustical waveguide. The width of the optical waveguide, i.e. the width of the stripe of the mask which is used to fabricate the waveguides varies from W=4,0 $\mu m$ to W=10.0 $\mu m$ in steps of 0.5 $\mu m$ for the different structures on one wafer as is illustrated in FIG. 16b (in FIG. 16a "x" denotes the number of the substrate produced). Additionally, acousto-optic mode converters again with straight acoustical guides but with tapered optical guides were prepared on each sample. In the tapered structures the width of the optical guide varies between 4.5 $\mu m$ to 7.5 $\mu m$ along the interaction length. For evaluating the birefringence variation, the pulse probing technique was employed as explained above with reference to the prior art document.

FIGS. 16c–f show the results of the measured birefringence variation in the waveguide plotted against the interaction length z, i.e. the longitudinal position, along the waveguide. It is clearly seen from FIGS. 16c–f that the birefringence variation is decreased with decreasing stripe width. Typically, the variation is a factor of about 3 larger in waveguides with 7 $\mu m$ width as the variation in structures with 5.5 $\mu m$ width (There seems to be a systematic trend that the birefringence decreases with increasing interaction length Z. This is very pronounced for the samples U1-0 and U1-7 shown in FIGS. 16c,d.

Figure 17A:
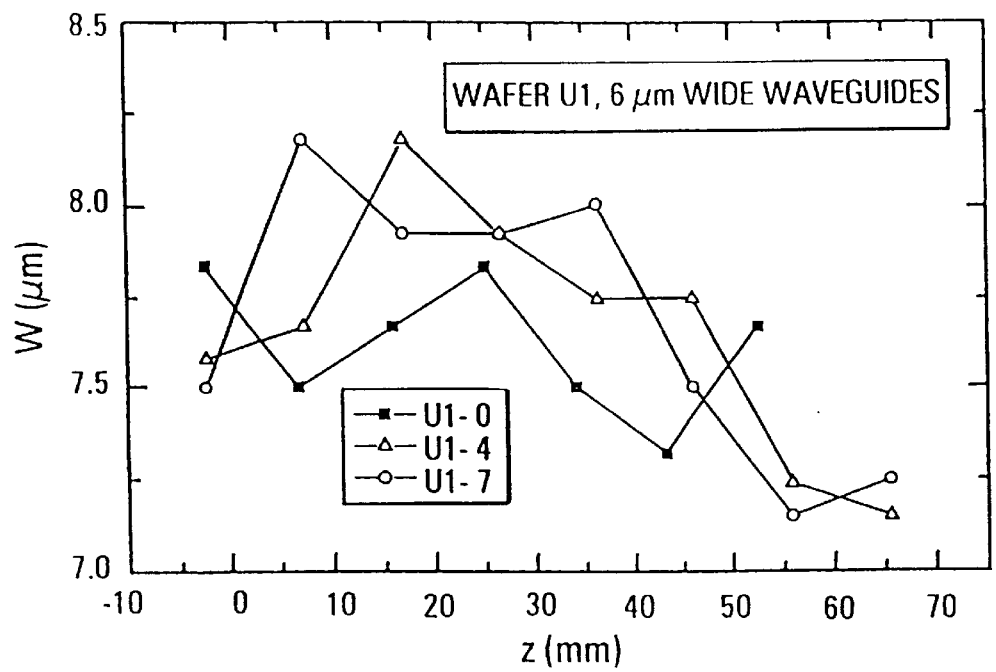
FIGS. 17a–17b show the change of waveguide width and waveguide thickness along the longitudinal direction of the waveguide.
Figure 17B:
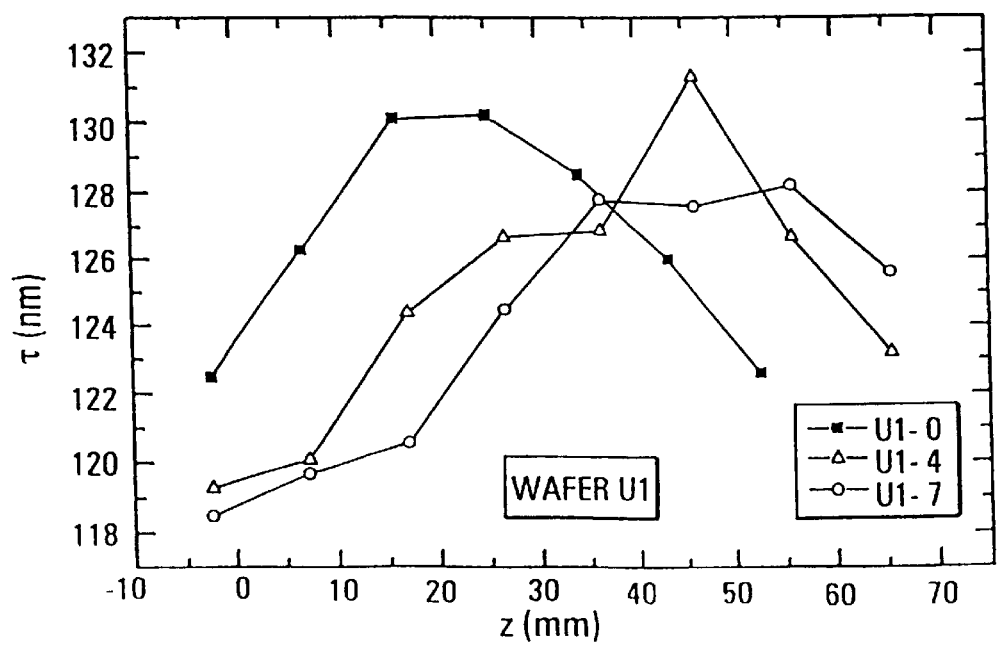

To identify the sources of the inhomogeneity, further investigations should be performed. The stripe width and layer thickness variation on the wafer was measured before indiffusion. Such results are shown in FIGS. 17a, 17b. In FIG. 17a the width of the Ti-stripe of the 6 $\mu m$ optical waveguides are shown versus the coupling length z. It varies from about 7.1 $\mu m$ to 8.2 $\mu m$ without showing any systematic trend.

The variations of the layer thickness are shown in FIG. 17b. It can be seen that along the interaction length, there is quite a large variation of the layer thickness. The absolute variation of the stripe width within the interaction length is about 0.8$\mu m$. From the investigation as done above one can conclude, that this corresponds to a birefringence variation of about $4 \times 10^{-4}$. The layer thickness varies about 10 nm along the interaction length which corresponds to a birefringent variation of about $4 \times 10^{-4}$. Therefore, the contributions to the homogeneity in birefringence due to the layer thickness and width variation are comparable.

As explained above, the preferable optical birefringent waveguide for use in an acousto-optical mode converter should have a propagation constant as close to cut-off as possible. A preferable range of width (before indiffusion) should be between 4 and 7 $\mu m$, preferably between 4 and 5.5 $\mu m$ together with a layer thickness of 1050 Å to 1250 Å, preferably 1050 Å to 1150 Å. Operating the optical waveguide in the wavelength region between 1530 nm and 1565 nm, such specification would require the cut-off wavelength of the waveguide to be below 1650 nm and about 1570 nm and preferably of about 1600 nm. For other wavelength ranges (operating wavelengths) analogous considerations hold.

In may be noted that the above given values hold for the refractive index change between the Ti doped waveguide and the $LiNbO_3$ substrate. If the refractive index change and operating wavelength window is altered, different values of thickness and width need to be used. These can be determined by a person skilled in the art easily via experiments, such that monomode behaviour is maintained, whilst at the same time the waveguide width and thickness is optimised such that the normalised frequency of the single guided mode (i.e. the propagation constant of the fundamental TE and TM-modes) is as close to the cut-off wavelength as possible.

Therefore, the invention is not restricted to the afore mentioned values or materials and the same effect will likewise occur in other waveguides: waveguides that guide the fundamental mode near cut-off will exhibit a smaller contribution of birefringence to the total birefringence. Therefore, the birefringence variation is always less dependent on a change of fabrication parameters, if the width and thickness is as small as possible, i.e. the propagation constant is as close to cut-off as possible.

INDUSTRIAL APPLICABILITY

Figure 3:
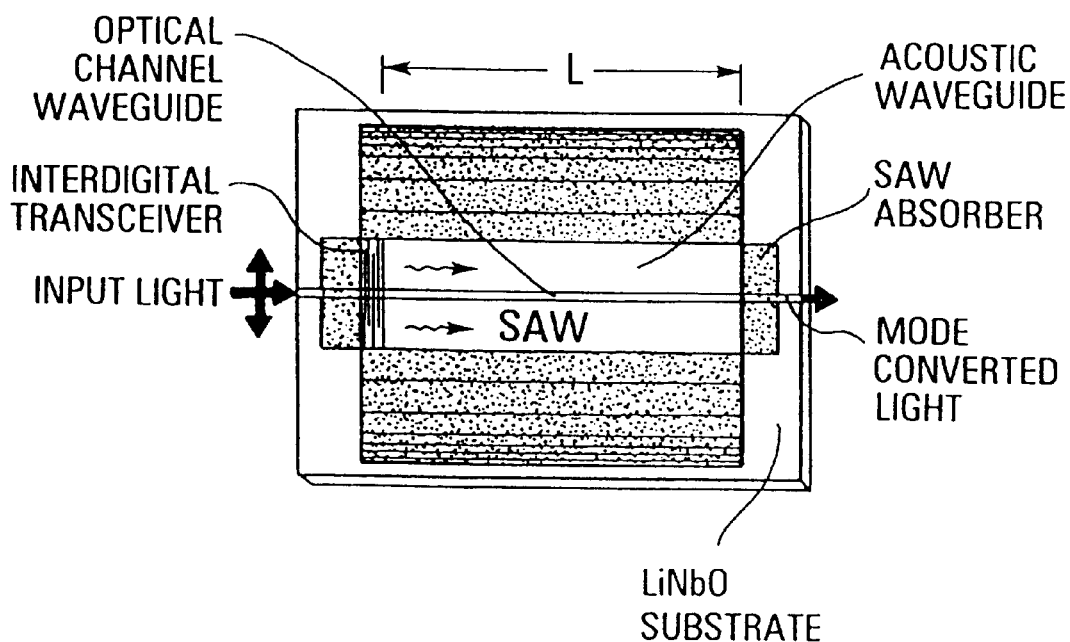
FIG. 3 shows a basic mode converter design.
Figure 6:
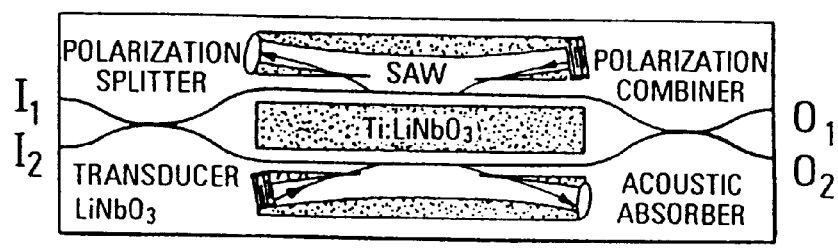
FIG. 6 shows an acousto-optic tunable 2×2 wavelength space switch using a polarisation beam splitter and a polarisation combiner at the input and output.
Figure 7:
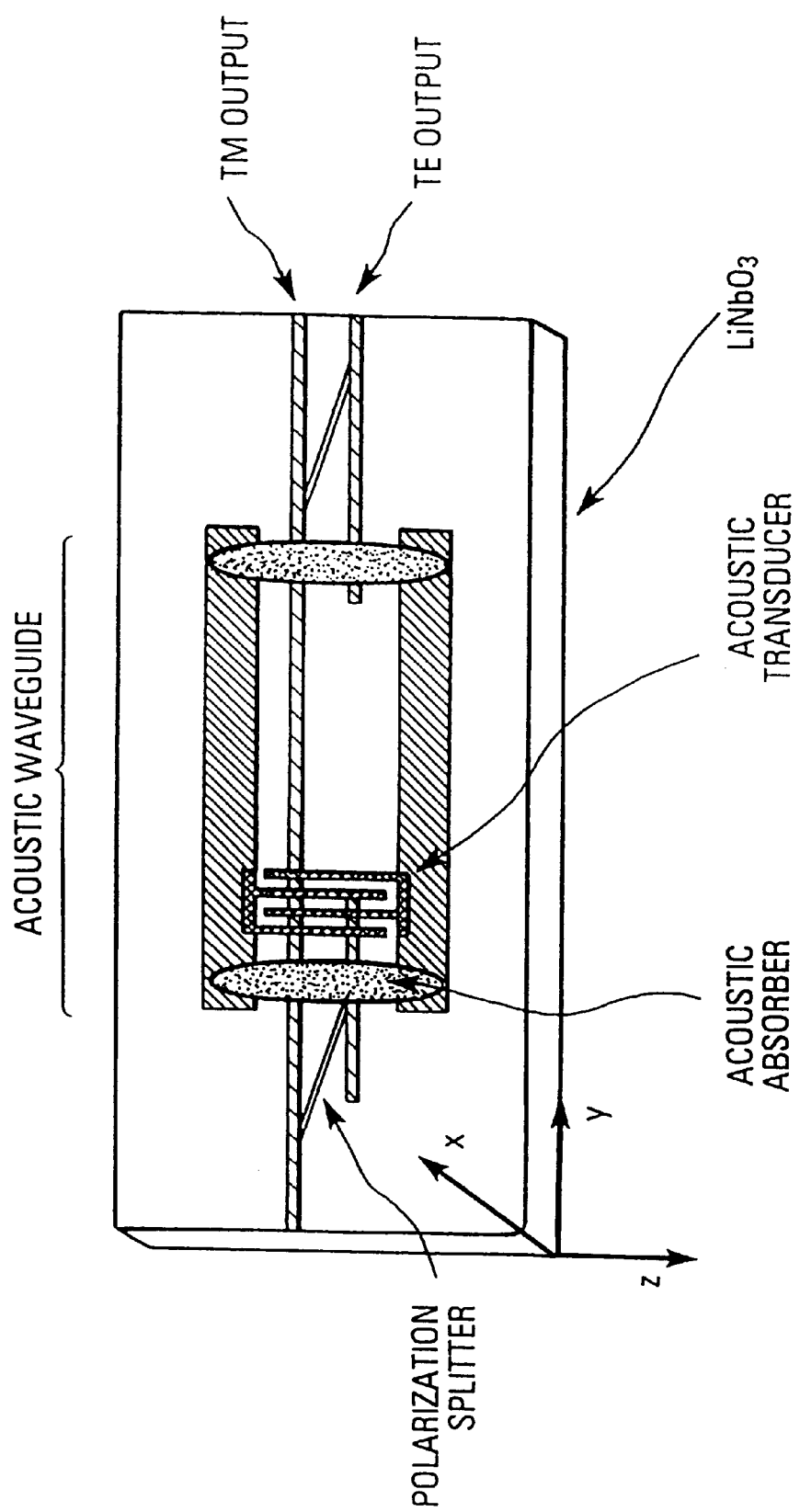
FIG. 7 shows the configuration of an acousto-optical filter.
Figure 8A:
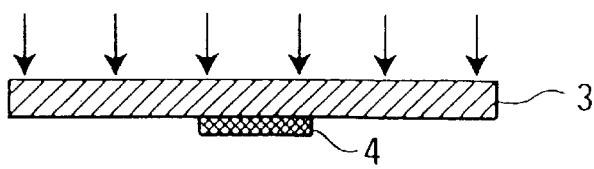
FIGS. 8a–8e shows a conventional "lift-off" manufacturing method for making an indiffused waveguide.
Figure 8B:
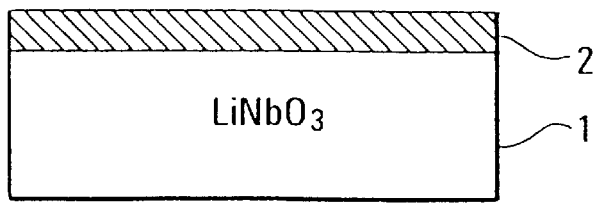
Figure 8C:
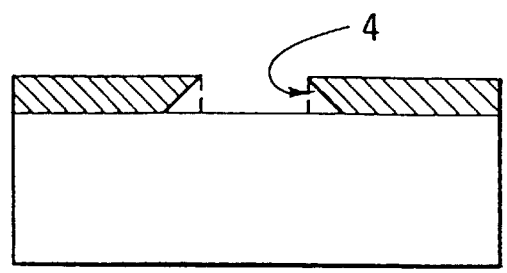
Figure 8D:
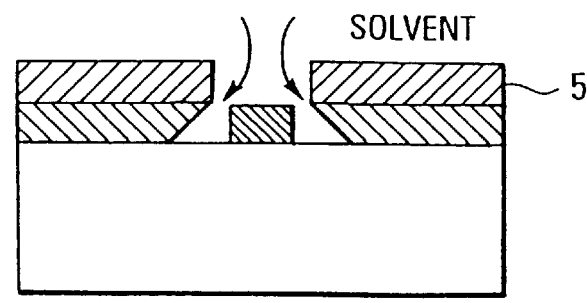
Figure 8E:
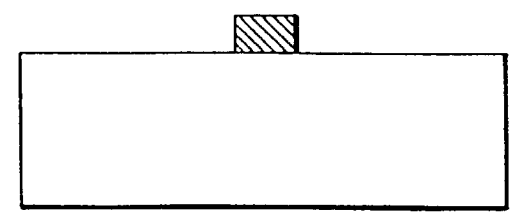

As shown above, the optical waveguides according to the invention have a far more stable birefringence with respect to a change of fabrication parameters, i.e. the waveguide thickness, width and the diffusion temperature. Advantageously, such optical waveguides can be used in acousto-optic tunable 2×2 wavelength space switches as in FIG. 6, in basic acousto-optical mode converters as in FIG. 3 or in acousto-optical filters as in FIG. 7. All such devices being based on an acousto-optical effect will exhibit a smaller change in the conversion frequency with respect to a change of fabrication parameters. If the birefringent variation is smaller along the optical waveguide, the phase matching condition can be fulfilled better.

Therefore, only the invention has for the first time realised that the birefringence variation decreases with respect to variations of its manufacture parameters, if the width and thickness of the guide is reduced. Also a diffusion of higher diffusion temperature can contribute to achieve more stable optical waveguides.

Although the invention has been described above with reference to a diffused waveguide in a birefringent substrate used in an acousto-optical mode converter, it should be understood that the teachings disclosed herein can be generally applied to all kinds of waveguides (birefringent, isotropic or anisotropic) and optical components using such waveguides. The effects of changes of fabrication parameters on the performance of the waveguide (e.g. birefringence variation) will be diminished whenever the waveguide dimensions are selected such that the propagation constant is close to the cut-off.

The invention is not limited to the above-described embodiments, which are currently perceived as the best mode of the invention and which only serve the general explanation of the principle of the invention. Within the scope of the invention, as defined in the dependent claims, the invention can also be realized with other embodiments which have not been described above. In particular, the invention can comprise features, which result from a combination of the respective single features of the claims. Reference numerals in the claims, in the description and in the drawings only serve illustration purposes to facilitate the understanding of the invention and do not limit the scope of protection.

What is claimed is:

1. An acousto-optical mode converter, comprising:
   a) a birefringent substrate (1);
   b) at least one optical waveguide (6) provided in said substrate (1);
   c) an acoustic waveguide arranged substantially collinear to said optical waveguide (6); and
   d) a transducer;
   e) the waveguide parameters of said at least one optical waveguide are selected such that the lowest cut-off wavelength ($\lambda_{cTE}$, $\lambda_{cTM}$) of the cut-off wavelengths for the fundamental TE- and TM- modes in said optical waveguide is smaller than 1650 nm.

2. An acousto-optical mode converter according to claim 1, wherein
   said optical waveguide (6) is a diffused channel waveguide or a rib waveguide.

3. An acousto-optical mode converter according to claim 2, wherein
   said waveguide parameters comprise at least the height ($\tau$) and the width (w) of a waveguide material stripe (8) before indiffusion.

4. An acousto-optical mode converter according to claim 3, wherein
   said stripe height is in the range of $1050 \times 10^{-10}$ m to $1250 \times 10^{-10}$ m and said stripe width is in the range of 4.0 $\mu$m to 5.5 $\mu$m.

5. An acousto-optical mode converter according to claim 3, wherein
   a stripe height/stripe width parameter pair is defined to be: $1050 \times 10^{-10}$ m/5.2 $\mu$m, $1150 \times 10^{-10}$ m/4.5 $\mu$m or $1250 \times 10^{-10}$ m/4.1 $\mu$m.

6. An acousto-optical mode converter according to claim 3, wherein
   said stripe width (w) is larger than said stripe height ($\tau$).

7. An acousto-optical mode converter according to claim 1, wherein
   a substrate material is $LiNbO_3$.

8. An acousto-optical mode converter according to claim 1, wherein
   a waveguide material is Ti.

9. A 2×2 acousto-optical tunable switch, comprising an input polarisation beam splitter and an output polarisation beam splitter and an acousto-optical mode converter according to claim 1 arranged between said input polarisation beam splitter and said output polarisation beam splitter.

10. An acousto-optical tunable filter, comprising an acousto-optical mode converter according to claim 1.

11. An acousto-optical mode converter according to claim 1, wherein
    said acoustic waveguide is fabricated by a titanium diffusion.

12. A method for manufacturing an acousto-optical mode converter including at least one diffused channel optical waveguide, comprising the following steps:
    a) preparing a birefringent substrate;
    b) forming an acoustic waveguide;
    c1) selecting a waveguide material to be diffused into said substrate;
    c2) diffusing a stripe of said waveguide material into said substrate for forming the diffused channel optical waveguide substantially collinear to said acoustic waveguide; and
    d) forming a transducer on a main surface of said substrate;

wherein e) the diffused channel optical waveguide is formed by diffusing the stripe of waveguide material, having predetermined dimensions, into said birefringent substrate using predetermined diffusion parameters; and f) said predetermined dimensions of said stripe before indiffusion and said predetermined diffusion parameters are selected such that after diffusion the lowest cut-off wavelength ($\lambda_{cTE}$, $\lambda_{cTM}$) of the cut-off wavelengths for the fundamental TE- and TM-modes in said optical waveguide is smaller than 1650 nm.

13. A method according to claim 12, wherein a substrate material is LiNbO$_3$ and a waveguide material is Ti.

14. A method according to claim 13, wherein a height of said stripe is in the range of $1050 \times 10^{-10}$ m to $1250 \times 10^{-10}$ m and a width of said stripe is in the range of 4.0 μm to 5.5 μm.

15. A method according to claim 14, wherein a height/width parameter pair is defined to be: $1050 \times 10^{-10}$ m/5.2 μm, $1150 \times 10^{-10}$ m/4.5 μm, or $1250 \times 10^{-10}$ m/4.1 μm.

16. A method according to claim 13, wherein a predetermined diffusion temperature is about 1060° C.

17. A method according to claim 13, wherein a predetermined diffusion time is 9 h and an indiffusion temperature is in the range of 1030° C.–1060° C.

18. A method according to claim 12, wherein said acoustic waveguide is fabricated by a titanium diffusion.

19. An optical waveguide, in particular for use in an acousto-optical device having an acoustic waveguide, comprising waveguide parameters (Δn, ω, t) being selected such that the lowest cut-off wavelength ($\lambda_{cTE}$, $\lambda_{cTM}$) of the cut-off wavelengths for the fundamental TE- and TM-modes in said optical waveguide is smaller than 1650 nm, and wherein said acoustic waveguide is fabricated by a titanium diffusion.

20. A method for manufacturing an optical diffused waveguide, in particular for use in an acousto-optical mode converter having an acoustic waveguide, comprising the following steps:

a) preparing a birefringent substrate;

b) selecting a waveguide material to be diffused into the substrate; and c) diffusing a stripe of said waveguide material into the substrate for forming said optical diffused waveguide in the substrate;

wherein d) said optical diffused waveguide is formed by diffusing a stripe of waveguide material of predetermined dimensions into the substrate using predetermined diffusion parameters; and e) said predetermined dimensions of said stripe before indiffusion and said predetermined diffusion parameters are selected such that the lowest cut-off wavelength ($\lambda_{cTE}$, $\lambda_{cTM}$) of the cut-off wavelengths for the fundamental TE- and TM-modes in said optical diffused waveguide after indiffusion is smaller than 1650 nm.

21. A method according to claim 20, wherein said acoustic waveguide is fabricated by a titanium diffusion.

22. An optical waveguide (6) indiffused in a birefringent substrate (1), in particular for use in an acousto-optical mode converter having an acoustic waveguide, comprising parameters (Δn, w, τ) of a stripe of waveguide material before indiffusion into the substrate being selected such that the lowest cut-off wavelength ($\lambda_{cTE}$, $\lambda_{cTM}$) of the cut-off wavelengths for the fundamental TE- and TM-modes in said optical waveguide after indiffusion into the substrate is smaller than 1650 nm.

23. An optical waveguide according to claim 22, wherein said acoustic waveguide is fabricated by a titanium diffusion.

24. An acoustic optical mode converter comprising a substrate, an acoustic waveguide, a transducer and at least one optical waveguide formed by an indiffusion of a stripe of waveguide material of predetermined dimensions into the substrate, wherein prior to indiffusion, the predetermined dimensions as well as predetermined diffusion parameters are selected such that the lowest cut-off wavelength ($\lambda_{cTE}$, $\lambda_{cTM}$) of the cut-off wavelengths for the fundamental TE- and TM- modes in the optical waveguide after indiffusion is smaller than 1650 nm.

25. An acousto-optical mode converter according to claim 24, wherein said acoustic waveguide is fabricated by a titanium diffusion.

26. A birefringent optical waveguide, in particular for use in an acousto-optical mode converter having an acoustic waveguide, formed by an indiffusion of a stripe of waveguide material of predetermined dimensions into a substrate, wherein the predetermined dimensions as well as diffusion parameters are selected such that the lowest cut-off wavelength ($\lambda_{cTE}$, $\lambda_{cTM}$) of the cut-off wavelengths for the fundamental TE- and TM-modes in the optical waveguide after indiffusion is smaller than 1650 nm.

27. An optical waveguide according to claim 26, wherein said acoustic waveguide is fabricated by a titanium diffusion.

28. An optical waveguide indiffused in a substrate, in particular for use in an acousto-optical device having an acoustic waveguide, the optical waveguide indiffused in a substrate comprising waveguide parameters (Δn, ω, t) being selected such that the lowest cut-off wavelength ($\lambda_{cTE}$, $\lambda_{cTM}$) of the cut-off wavelengths for the fundamental TE- and TM-modes in said optical waveguide is smaller than 1650 nm.

* * * * *